US010007767B1

(12) United States Patent
Ahmed et al.

(10) Patent No.: US 10,007,767 B1
(45) Date of Patent: Jun. 26, 2018

(54) SYSTEM AND METHOD FOR SECURING TENANT DATA ON A LOCAL APPLIANCE PRIOR TO DELIVERY TO A SAAS DATA CENTER HOSTED APPLICATION SERVICE

(75) Inventors: Zahid N. Ahmed, Westborough, MA (US); Harsha Ramalingam, Hopkinton, MA (US); Andrew Wilson Homer, Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1327 days.

(21) Appl. No.: 11/962,545

(22) Filed: Dec. 21, 2007

(51) Int. Cl.
*G06F 21/10* (2013.01)
*G06F 21/31* (2013.01)
*G06F 21/30* (2013.01)

(52) U.S. Cl.
CPC ............ *G06F 21/10* (2013.01); *G06F 21/30* (2013.01); *G06F 21/31* (2013.01)

(58) Field of Classification Search
USPC ............................ 705/51, 52, 57; 380/228
See application file for complete search history.

(56) References Cited

U.S. PATENT DOCUMENTS

| | | | |
|---|---|---|---|
| 2002/0112171 A1* | 8/2002 | Ginter | G06F 21/10 713/185 |
| 2003/0065749 A1* | 4/2003 | Gailey | H04L 29/06027 709/219 |
| 2003/0161476 A1* | 8/2003 | Fransdonk | G06Q 20/12 380/282 |
| 2005/0228994 A1* | 10/2005 | Kasai | G06F 21/40 713/168 |
| 2007/0067429 A1* | 3/2007 | Jain | G06F 17/30029 709/223 |
| 2008/0222108 A1* | 9/2008 | Prahlad | G06F 17/30616 |
| 2008/0320081 A1 | 12/2008 | Shriver-Blake et al. | |
| 2010/0017859 A1 | 1/2010 | Kelly et al. | |

* cited by examiner

Primary Examiner — Tsan-Yu J Huang
(74) Attorney, Agent, or Firm — Muirhead and Saturnelli, LLC

(57) ABSTRACT

An extensible servicing hosting platform is provided that supports the design, build and concurrent deployment of multiple web accessible services on a services hosting platform. The services hosting platform comprises a services hosting framework capable of hosting multiple service applications, each of which may be shared by multiple tenants that each customize their use of a particular application service by extending the application service to exploit run time platform services within a service execution pipeline. The services hosting framework may easily be leveraged by applications to decrease the time associated with developing, deploying and maintaining high quality services in a cost effective manner.

9 Claims, 17 Drawing Sheets

SYSTEM AND METHOD FOR SECURING TENANT DATA ON A LOCAL APPLIANCE PRIOR TO DELIVERY TO A SAAS DATA CENTER HOSTED APPLICATION SERVICE

FIELD OF THE INVENTION

This invention relates generally to networked computing systems and more particularly to a Software as a Service (SaaS) architecture.

BACKGROUND OF THE INVENTION

Software as a Service (SaaS) has recently grown in popularity as a low cost way for businesses to obtain the benefits of commercially licensed, internally operated software without the complexity and cost typically associated with obtaining and maintaining the software. SaaS is a software delivery model which makes software applications available to customers via the internet. The software applications are hosted and operated by the software developer (or a third party), for use by the customer. Revenue is paid to the software developer for the use of the application by the customer, rather than for the ownership of the application. SaaS thus enables customers to outsource business processes, such as backup and recovery or other services, to increase the availability, reliability and cost effectiveness of administration of the services.

SaaS offerings are generally commercially available applications, (i.e., not customized) that are accessed via the web-based applications that are delivered via standard Internet Browser and mobile browsers client as well as web based application programming interfaces that are integrated into customer's applications. SaaS applications are typically 'hosted' from a centralized location rather than at the customer sites via remote customer accesses. SaaS vendors typically use a multi-tenant architecture where multiple different tenants each execute the same software that processes their tenant owned data. Centralized management of a SaaS application permits centralized feature updating, thereby removing the need for downloading of patches and upgrades. Examples of popular SaaS applications include Customer Relations Management (CRM), video conferencing, accounting and email services. In general currently SaaS vendors support the delivery of a single application as a SaaS rather than providing a platform that can deliver and host multiple applications as software as a services.

The SaaS business model is an evolution from the Application Services Provider (ASP) model and overcomes several problems of the ASP model. In an ASP business model, a service provider obtains a commercially available application and hosts the application for customers by generating a unique application instance that is dedicated to supporting the particular customer. Although the ASP hosts the applications, the applications are typically authored by third party application providers.

One problem with the ASP model is the difficulty associated with supporting the third party software because the ASP would not typically have the expertise to support the third party offerings. In addition because the ASP architecture generates separate application instances for each customer use, delivering patches and upgrades to the customers is a non-trivial task. Supporting and maintaining the separate application instances makes it difficult to effectively scale an ASP solution.

The SaaS architecture overcomes scalability and maintenance issues through the use of one software application, for which maintenance upgrades can be made instantly available across the entire customer base. However, the advantages of the SaaS system can also be viewed as drawbacks; while the SaaS model allows a software application to be viewed as a commodity that is available to all customers, it can't be ignored that each customer will have differing needs which may be better suited by customization of the software application. In addition the centralized management of applications and data across wide customer bases may cause security concerns for customers. Accordingly, it would be desirable to identify an architecture which would realize the benefits of the SaaS architecture while enabling a degree of customization and an assurance of security and privacy to the customers.

SUMMARY OF THE INVENTION

According to one aspect of the invention, a method of securing tenant data prior to transferring the tenant data on a storage medium to a host data center includes the steps of generating a custom key for the tenant, encrypting the tenant data using the custom key, encrypting the custom key using a public certificate of a Vault Service provided by the host infrastructure, storing the encrypted custom key and the encrypted tenant data on the storage medium and transferring the storage medium to the host data center.

According to a further aspect of the invention, a method of securing customer data at a host platform includes the steps of generating a customer key, generating an index of the customer data, encrypting the index using a public key, encrypting the customer data using the customer key to provide encrypted customer data; and forwarding the encrypted customer data together with the encrypted index to the host platform to enable the host to decrypt the encrypted index using the public key and manipulate the encrypted customer data using the decrypted index.

According to another aspect of the invention, a host platform includes a storage device for storing encrypted customer data and an encrypted index to the encrypted customer data, wherein the encrypted customer data and the encrypted index to the customer data are encrypted using different keys and a computer readable medium having program code stored thereon operable when executed by a processor of the host platform to provide a service to a customer associated with the encrypted customer data using the decrypted index of the customer data.

DETAILED DESCRIPTION

Definitions

Figure 1:
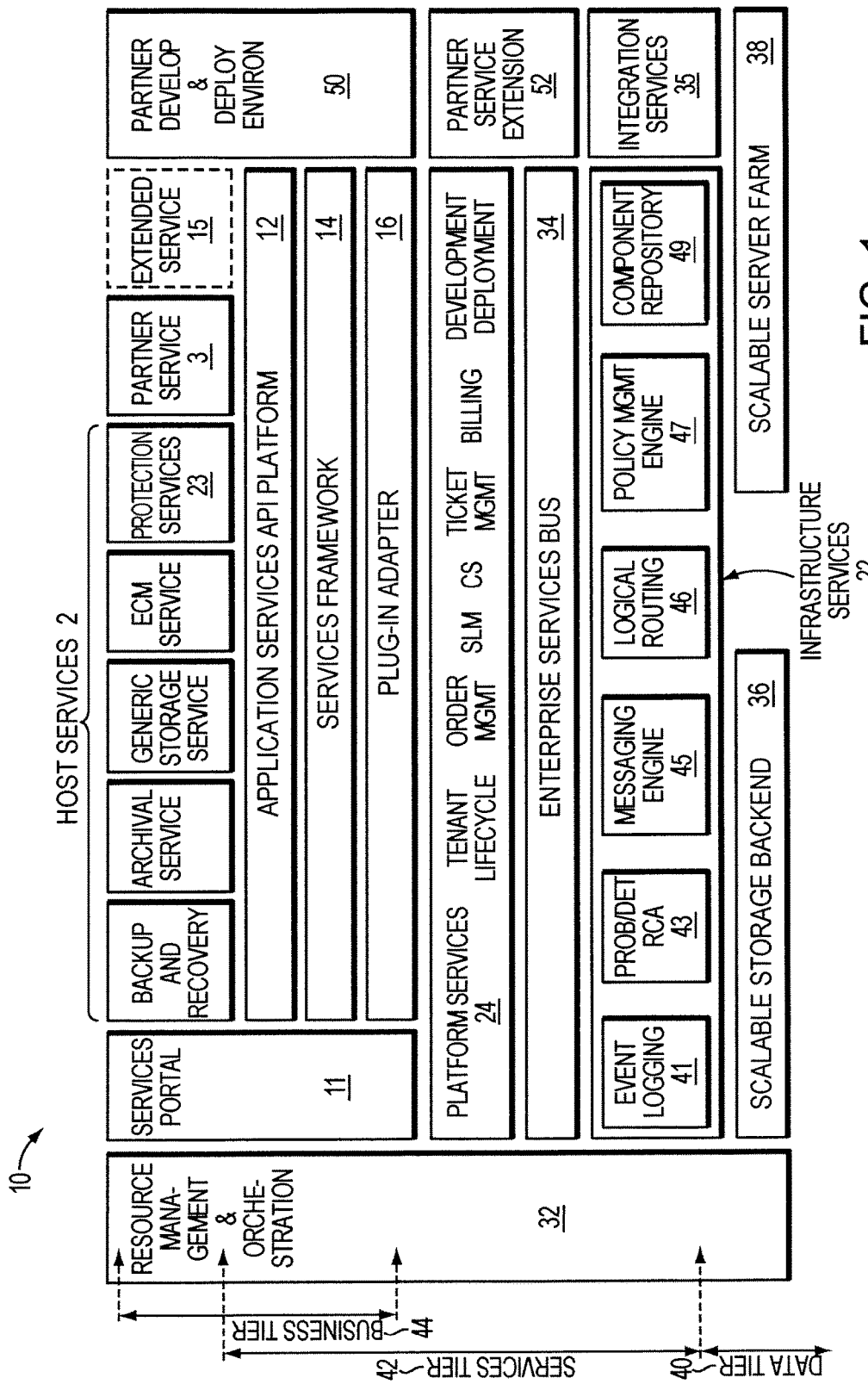
FIG. 1 illustrates a variety of functional modules which may be provided as part of a service platform architecture of the present invention.

In the below description, certain terms shall be defined as follows:

An application service comprises program code associated with one or more services that can each be invoked over a Internet using a publicly exposed Application Programming Interface (API). Application services include host services developed by a host provider and hosted on the platform, partner services developed by a third party via a suite and hosted on the platform, and extended services comprising third party ISP services that extend existing host services and are hosted on the platform.

A host is an entity that supplies a service to a tenant.

A host infrastructure includes hardware and software provided by the host for use by the tenant. Multiple tenants may have simultaneous access to the host infrastructure.

A platform service includes re-usable service provided by the platform, infrastructure services and security and privacy services. Platform services may be either directly accessed by a tenant or invoked internally by application services.

A service is a unit of work performed by the host for the benefit of one or more tenants utilizing the infrastructure of the host. A service may range from an application service that is typically invoked or exploited by a tenant such that the service is effectively outsourced to the host to cost-effectively exploit the reliability, security and and other administrative capabilities of the host. The service may also comprise a security and privacy service that may be layered upon any hosted service such that the resulting combined service provides enhanced capabilities around privacy, business continuity and security.

Software as a Service (SaaS) shall be defined as software deployed as a hosted service and that can be accessed over the Internet.

A tenant is a customer of the host such that the tenant subscribes to services provided by the host. Each tenant may include one or more users (also referred to herein as 'clients').

Application Services Hosting Framework

According to one aspect of the invention an extensible Software as a Service (SaaS) platform is provided that supports the design, build and concurrent deployment of multiple web accessible services on a services hosting platform. The services hosting platform comprises a services hosting framework which may be shared by multiple tenants, each of which may customize their use of a particular application service by extending the application service to exploit run time platform services within a service execution pipeline. The present invention thus provides a significant advantage over prior art SaaS architectures, where customers sharing the same code base for the application service run time could not dynamically modify the application behavior and the application configuration was not customizable.

The present invention also provides a significant advantage over typical Software Oriented Architectures (SOA). In general there are two types of SOA technologies available today; those that are commercial products and are designed for enterprise customers where the data and applications that were being managed by SOA platforms resided locally in the enterprise. In such systems the security of a customer's data was generally accomplished by limiting the exposure of the data locally managed by the SOA platform. A second form of SOA is used by service providers such as Yahoo, MSN and Google to provide services to the public via the Internet. Such service offerings allow tenants to cost-effectively use the resources of the service provider. One problem with such services is that they do not fully guarantee tenant content protection, rather each publicly accessible Internet service shares some underlying content in the Internet community. For example, to use a sale service provided by Amazon.com results in a sale being extended to all Internet users that access the site; there is no way to restrict the offer to sell to a particular audience. Similarly, messaging services available from Yahoo do not include the ability to protect message data from distribution to particular members within a group; rather, any member that registers for the group may access the message.

In contrast, the present invention allows customer data to be secured even when exposed to application services that are hosted over the Internet through selective addition of security and privacy services to enable delivery of applications as secure services to multiple tenants. In essence, the present invention provides a virtual private Internet environment for multi-tenant service delivery; content and application protection, privacy and security previously found in locally managed SOA technologies augments an Internet coupled services framework, which leverages the reliability, 24/7 accessibility and flexibility of Internet service offerings, to provide a cost effective, reliable, monetizable and secure services host platform.

As will be described in more detail below, security and privacy services for application and data are not the only host services which may be leveraged by applications; rather the services execution pipeline for any application may be augmented with any one of numerous services offered as part of the services host platform, including but not limited to use case independent usage tracking, problem detection and root cause analysis services, and various other administrative, management and monitoring capabilities. The addition of such services allows any application service to incorporate an automated method for detecting errors and tracking usage in real time. In a services host platform implementation wherein thousands of tenants may share access to applications and infrastructure, the ability to track usage and detect problems in real time is crucial to maintaining system resiliency; the ability of the present invention to provide this capability is a significant advantage that has not been provided by any of the known SOA systems that can be used for building, deploying and delivering applications that are available over the Internet 24/7.

The services hosting framework thus exposes a variety of platform services to any application service, whether provided by the host service provider or developed by a third party and hosted on by the services host platform in a secure, reliable and extensible manner. Providing such a framework which makes re-usable platform services available to third party applications, monetization of the platform services may easily be realized.

The service framework is are exposed to tenants via web based APIs, and web based application components, and the services. Furthermore the services offered by a platform may be dynamically extended to include third party application services by modifying the set of APIs and application components that are exposed to the tenants. An application component is a small application function that is made accessible via web based pages that can be downloaded to a browser client). Components may themselves call web based APIs. Application components are delivered as part of web based pages. Examples of application components that are delivered via web based pages include TLM, which may also be delivered via web based APIs. Examples of TLM APIs include AddUserProfile, GetUserProfile, AdminPolicyConfigure, etc.

Exemplary application services provided by an extensible Services hosting platform such as that of the present invention include, but not are limited to, Information Technology (IT) services (such as backup and recovery, archiving, generic storage), information management services (such as compliance services, litigation services, etc.), customer relation services, Enterprise Content Management (EMC) services (such as HR applications that manipulate corporate records) and the like. In addition it will be appreciated that the extensible nature of the services host framework may be adapted to integrate any type of service into the platform, and thus the present invention is not limited to any particular service offering but rather may be used to provide a holistic service solution to customers.

Certain platform services (such as security and privacy services) may be used both as web accessible services via exposed APIs, or may be invoked by other platform or application services using internal APIs. As a result, customers can utilize the services host framework to obtain a wide array of high quality services that they have been heretofore unable to obtain due to equipment cost and management complexity, while the host can obtain monetary remuneration for both the base services and any service extensions.

As will be described in more detail below, the extensible nature of the service execution pipeline enables tenants to protect both applications and data by layering security and privacy services (key management services, ID verification services) and business continuity services on top of their existing application. A further advantage of the Services hosting platform of the present invention is that the web-based interface of the Services hosting platform allows services to be accessed by a wide range of geographically diverse customers, from individual consumers to small, medium and large enterprises.

FIG. 1 illustrates various logical components of the extensible services host platform of the present invention deployed as part of a storage host infrastructure. The architecture is a multi-tiered architecture comprising a data tier 40, services tier 42 and business tier 44. In general the data tier comprises components specifically associated with the host infrastructure. The business services tier includes those services which may be directly accessed by tenants via the Internet, (also referred to herein as internet accessible application services or web services) and can also be viewed as revenue generating services of the host. The services tier includes those services which interface the business tier with the data tier. It should be noted that although certain services may be described herein as part of certain tiers, it is not a requirement of the invention that any particular service be restricted to inclusion in a particular tier.

A tenant may access the application services via an internet accessible portal 11. Web services may include those associated with Host Services 2, Partner Services 3 and any dynamically incorporated services (such as Extended service 15). Host services are SaaS centric applications that are developed, maintained and hosted by the host. Partner services are developed and maintained by a third party application service provider for example an ISP, such that those applications are hosted on the SaaS service at the host data center. The Host Services may include services provided by the Host Infrastructure (such as, in the example of FIG. 1, Backup and Recovery, Archival, generic storage, Enterprise Content Management, etc.)

According to one aspect of the invention, Host Services may include one or more Security and privacy services 22 which can be used to support tenant security and business continuity in an application independent manner. Security and privacy services include services that can be used to protect content accessibility such as authentication and authorization services, encryption services, business continuity services and Key Management services. Content accessibility can be protected by maintaining confidentiality of customer content at the services host platform using an encryption key as well as controlling access to the content and access to applications that use the content. Examples of services that benefit from security and privacy services include secure backup services, mail archiving services which provide continuity in the event of tenant equipment failure, etc. The security and privacy services differ from conventional Host services in that, although they may be directly invoked using abstracted APIs by tenants, the security and privacy services may also be invoked by other Host, Partner and Extended services.

A Partner service is developed, deployed and maintained by the partner using tools 50. The Partner service can be developed and deployed by the partner at the partner site, or at the Services hosting platform data center, and is hosted by the Services hosting platform. The Partner service may be integrated into the platform offering via the partner services extensions 52, integration services 35 and portal 11. Platform components may include APIs that may be used by third-party Partners Applications to access the common platform components. Third-party vendors can be provided with an SDK to develop their own service extensions to work along side the platform components.

The extended services element represent new services socket that may be used to incorporate services that are not supported by the base set of services offered by the platform but which are well suited for migration to the services host framework, and may subsequently added to the framework by exposing an API for the extended service to tenants. An example of such an extended service is as any service which involves data exchange over the Internet (for example, an email management service).

Web service APIs are managed by the web services API platform 12. The web services APIs may be implemented using protocols such as Representational State Transfer (REST) or Simple Object Access Protocol (SOAP) or the like, but essentially the API includes a Uniform Resource Locator (URL) to the program code associated with a handler for the associated service. In one embodiment, the APIs associated with a given web service are downloaded to the tenant when the tenant registers for a service. As a result, applications may be exposed to tenants via coarse-grained APIs that provide a small footprint download for a web-based application, thereby minimizing the round-trip delays and payload size and increasing the performance of delivering the services to the client.

Thus the services hosting framework 14 controls the implementation, deployment and exposure of services to tenants, for example by linking application service handlers with service resources from an available service pool.

A base set of platform services 24 may include one or more re-useable platform services such as tenant lifecycle management (TLM), Customer Support (CS) order management, Service Level Management (SLM), ticket management, billing, and other development and deployment services such as registration, service provisioning. The platform services are exposed to web services via the services API platform 16. A service interface repository (not shown) may be provided to support access and version management of services that execute on the platform.

Infrastructure services 22 include services that are related to the particular host infrastructure and are meant to be re-usable across different endpoint application services; according to one aspect of the invention, the infrastructure services include an event logging framework 41, a problem detection/root cause analysis (RCA) component 43, a messaging engine 45, a logical routing service 46, a policy management engine 47 and a content/object repository 49. In general, the infrastructure services are not directly accessible to the tenant via the APIs, but rather are invoked by the security and privacy services 23 and platform services 24, or directly by handlers in the services hosting framework. As will be described in more detail below, a client can customize a web service by selective linking of platform, infrastructure and security and privacy services to an application service handler in an extensible service pipeline.

In FIG. 1 an exemplary host infrastructure associated with data tier is shown to include a scalable storage backend 36, a scalable server farm 38, an Enterprise Services Bus (ESB) 34 and infrastructure services 22. The storage backend 36 and server farm 38 represent exemplary host equipment. The ESB 34 is an event-driven standards based messaging engine that communicates with the server farm 38 and scalable storage 36 using their respective protocols.

Other components which may be included in a services host platform of to the present invention include an application plug-in adapter 16 which enables integration of back end legacy applications to the Services hosting platform, by translating SaaS requests into the protocol of the legacy application or storage back-end device. A resource management and orchestration module 32 coordinates the generation, deployment, monitoring and maintenance of the host, platform and partner services to tenants using the host infrastructure in a manner consistent with the services hosting framework.

Accordingly, the services hosting framework includes an application services platform services. The platform services can be viewed as a service pool which may be used to customize, secure, monitor or otherwise enhance host, partner or extended application services. One benefit of providing a set of services that may be re-used in this manner is that it removes the need for individual host or partner applications to create and maintain the respective platform, infrastructure or security and privacy services while allowing both the host and partners to provide a richer service set to the customers in a cost effective manner without compromising customer content and/or IT security policies. Various services, including IT, security, transport, and messaging services become abstract components that may be re-used to add richness to any other service.

With such an arrangement, the Services hosting platform of the present invention provides a use case independent request processing infrastructure via light-weight, API oriented services hosting framework. Several advantages of such a structure include its ability to: a) exploit a re-usable, application-level authentication handler (and also retrieval of authorization data) for security token generation and use across multiple application services, b) exploit a re-usable, centralized, use-case independent usage tracking handler and c) exploit HTTP (and SSL) transport handlers via open-source, commodity, high performance servers.

Figure 2A:
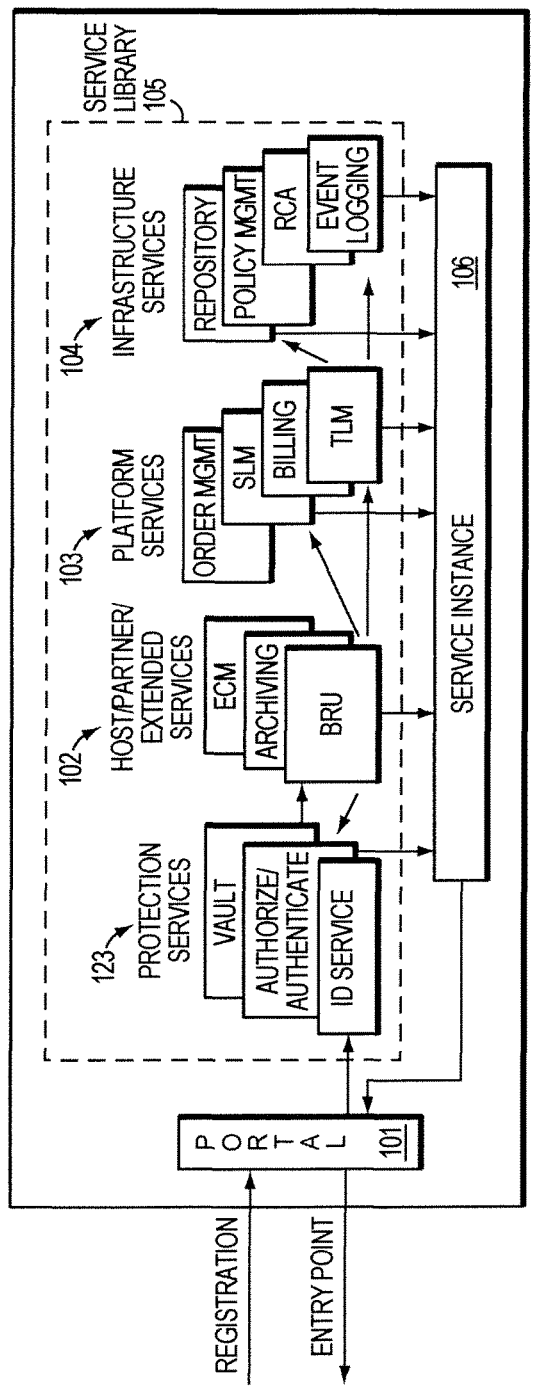
FIG. 2A illustrates a subset of components 100 that may be included in a SaaS host of the present invention.

FIG. 2A illustrates a subset of components 100 that may be included in a SaaS host of the present invention. A portal 101 permits access to the Services hosting platform services by coupled tenants. In one embodiment, the portal is an application that operates on a web browser and is accessed over the internet by the tenant. The portal is linked to a library 105 of services provided by the services host framework. As described above with regard to FIG. 1, the service library 105 includes security and privacy services 122, host/partner/extended services 102, platform services 103 and infrastructure services 104. It should be noted that only a representative set of each of the services has been shown for purposes of clarity. Thus security and privacy services 123 are shown to include an Identification service, Authentication/Authorization service, Key Management service, etc. The platform services 103 are shown to include Tenant Lifecycle Management (TLM), billing, SLM and Order Management services, etc. The infrastructure services are shown to include Event logging services, Root Cause Analysis (RCA) services, policy management services and repository services, etc. The services in library 105 may be document style web services, written, for example, in XML as REST style API based services. The platform services are exposed to host/partner/extended services via programmatic APIs that are encapsulated within an abstract services hosting framework. The programmatic APIs can be directly invoked by end-point application services. Platform services may include legacy services and other services that are coded by other means. Interfaces to such services can be provided via plug in adapters as described in FIG. 1.

According to one embodiment of the invention, a tenant accesses a service by registering with the host. The particular steps taken to invoke a service will be described in more detail with regard to FIG. 4. However, according to one aspect of the invention authorization checks need to be carried out as part of processing requests for all services. Authentication is generally performed by a use case independent authentication handler. Thus, for each service two types of APIs may be exposed to a tenant; an authentication URL to which authentication requests are submitted and tokens are minted and returned to the calling client, and the application service API associated with the application request. Applications may require that requests be submitted with a valid token received via the authentication API associated with the application API. The token may be used to authenticate the requestor's credentials and access rights with regard to a particular service.

In one embodiment, the authentication service is hosted on a logically separate host, referred to herein as the authentication server, although this is not a requirement of the invention. The application service may be hosted on a logically or physically separate host. In one embodiment, the authentication service may be directly accessed via the application service; in alternate embodiments, the application service disables the authentication service during run time execution, and uses a token validator to validate tokens during run time.

Figure 3:
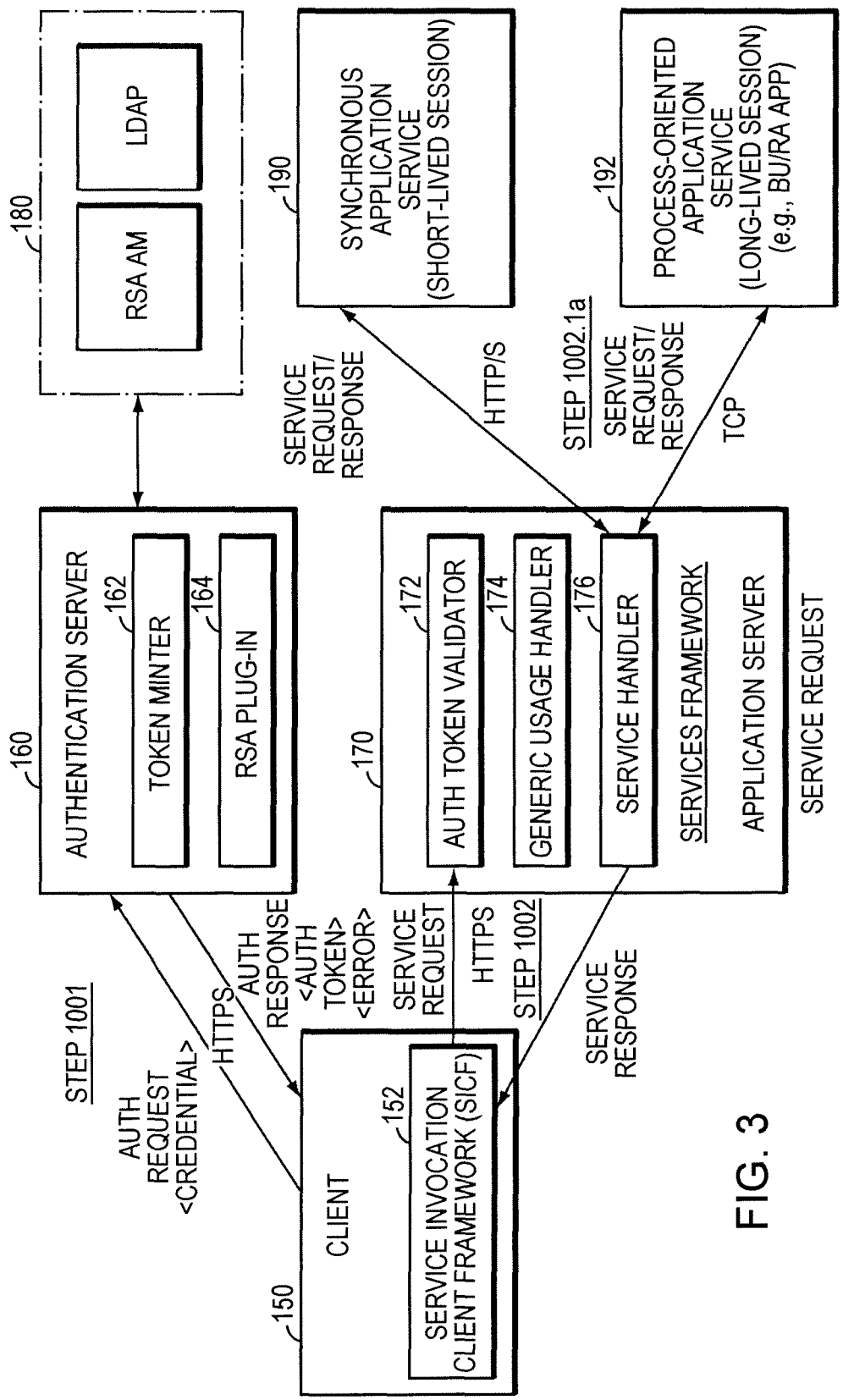
FIG. 3 is a functional flow diagram providing a high level view of exemplary steps performed during tenant authentication and registration.

FIG. 3 illustrates several components of a system comprising a client 150 coupled to a Services hosting platform including an authentication server 160 and an application server 170. The authentication server 160 includes a token minter 162 and RSA plug-in module 164 which communicates with a security module 180 (comprising, for example, an RSA Access Manager module and Lightweight Director Access Protocol module) during token generation. The application server 170 includes an authentication token validator 172, generic usage handler 174 (which may be used to monitor certain statistics regarding application usage as described in more detail below) as well as the service handler 176. The service handler may invoke one or more tenant associated sessions, such as a synchronous application service 190 or a process-oriented application service 192.

An authentication request is forwarded by the client, at step 1001, to gain access to or otherwise register for the service. In one embodiment, the authentication request includes a message header and payload components, such as <H1:Timestamp><Credential>, where the credential provides information regarding the authority of the particular client to access the service. The credential thus may be selected from a group including, but not limited to, a group identifier, a user identifier, an administrative domain, etc. In response to the authentication request, an authentication response if returned to the client in the form of:

<H1:Timestamp> <Token><Error><Duration>

Where H1 is the header, the timestamp field indicates the minting time for the token in the token field, the token is used to authenticate the client's ability to access the service, the error field includes an error code, returned, for example, when a token is not returned, and the duration field identifies a duration period during which the minted token is valid.

Each token may have the following elements:
        <Token Signature>
        <Token Attributes>
        <Expiration Time>
        <Tenant ID>:UUID
        <User ID>: String
        <Group ID1, Group ID2, . . . Group IDN>: Array (string)
        <RSA Security Token>:[Encrypted Data]

With such an arrangement, particular tokens may be associated with specific roles and group as part of an authentication process. Upon receipt of the token, at step 1002 the client 150 forwards the application server a service registration request. In an embodiment where authentication is performed as part of the service registration, the service registration request may have the form:

<x> Service Request <H1:Timestamp><Credential>
    And the response may have the form:
    <x> Service Response <H1: Timestamp> <Token> <Error> <Duration>

Thus, prior to the actual invocation of the service, the user is authenticated and a token is returned to the user. The service request may also include selectors indicating which of the platform services that the client wishes to include as part of the host service instance.

In FIG. 2, after a token is received by the client, (either as part of an authentication process or as part of a registration process described above), if it has not already done so, at step 1002 the client 150 issues a service registration request that includes the token. The token is validated by the token validator 172 and the service execution pipeline instance for the service is generated. As will be described in more detail later herein, the service execution pipeline may include an authentication handler which will validate the token provided during registration using the authentication server, the usage handler 174 and the service handler 176. Depending upon the type of service, the service handler may invoke either a synchronous application service session (which is a short lived session for carrying out a distinct, short lived service) or a process-oriented session (which is a long lived session for carrying out a longer lived service, such as backup and recover, etc.).

One feature of the present invention is the ability of the Services hosting platform to perform Role Based Access Control (RBAC). Role based access control ensures that only those users at the tenants having desired access attributes may utilize the program. To perform RBAC, certain authorization checks of the user should be performed. Token expiration time, a tenant ID, a user ID, and group IDs information in the token may be used to determine whether a user at a tenant is permitted to access the particular service. An API may be included as part of the Services hosting platform to check user Roles and Capabilities. The exemplary APIs shown below may be used:

API CheckROIES
    Input: User ID, Mode: Role, Capabilities set
    Output: (Role1, . . . . Role N)||boolean
    API CheckCapabilities
    Input: Role
    Output: (Capabilities1, . . . . Capabilities N)

Associated with each service instance 106 are request and response service execution pipelines instances. The service execution pipeline instances may include one or more pipeline stages, with at least one pipeline stage including the particular service handler associated with the requested service, and the other stages of the pipeline being determined according the particular platform, protection and infrastructure services used to augment the application service. The platform services that are used to augment the service handler may be selected by the hosting application service provider or, in one embodiment, selected by the tenant. For example, a tenant may select features of a service using the web browser during tenant registration with the host. As a result, tenants have the ability to configure and customize the delivery of their host service experience.

Figure 2B:
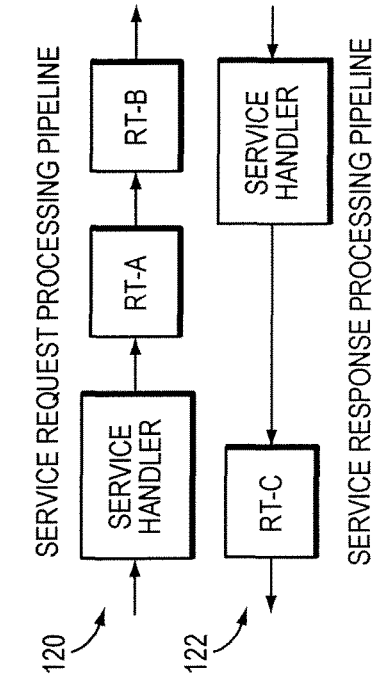
FIG. 2B illustrates an exemplary request service pipeline and response service pipeline that may be associated with a service instance.

FIG. 2B illustrates a generic request service pipeline 120 and response service pipeline 122 that may be associated with a service instance. Each pipeline includes a request or response service handler associated with a type of the service requested, as well as any additional platform services or infrastructure services (not shown) that are selected by the tenant or utilized by the application service. As will be described in more detail below, an example of an infrastructure service that may be included in the service pipeline is a logical routing service. The services performed by the stages of the execution pipeline of a service instance may be 'linked' using Aspect Oriented Programming (AOP) techniques.

The configuration of a service execution pipeline can be determined in response to a type of the web service and service instance specific policies stored in a service registry. For example, a specific policy may require the use of a specific authentication and authorization handler or an encryption/decryption handler for encoding/decoding index data. A more detailed discussion of particular configurations of service execution pipelines is provided below with regard to FIG. 7.

Figure 4:
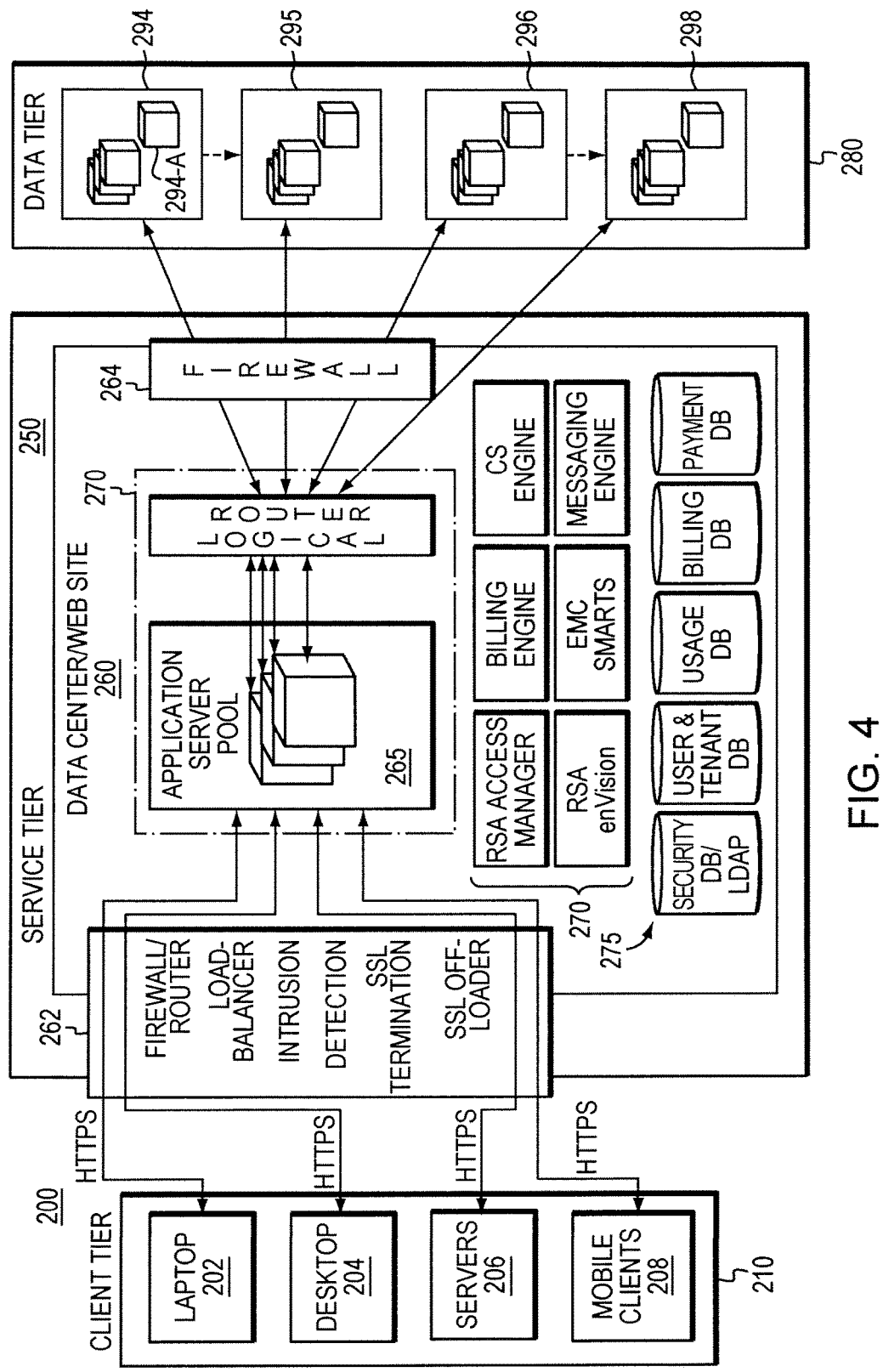
FIG. 4 is a block diagram of a storage network deploying a service framework of the present invention.

FIG. 4 is a block diagram of a storage network deploying a service framework of the present invention. The network comprises a client tier 210, a service tier 250 and a data tier 280. The client tier includes one or more devices capable of communicating with the service tier using the IP protocol. The client tier devices may be geographically distributed from the service tier, data tier and each other. The clients include both clients associated with the same tenant as well as clients associated with different tenants, and thus the service framework and data center are referred to as multi-tenant. Although client tier devices may communicate using a different communication media, each includes the capability to exchange hypertext documents with the service tier over an IP network. The client devices may implement the Hypertext Transfer Protocol (HTTP) or HTTP Secure (HTTPS) application layer protocol to exchange the hypertext documents with the service tier. Examples of client devices are shown in client tier 210 to include a laptop 202, desktop 204, server 206 and mobile client 208. Each client device may incorporate a different operating system (Windows, Windows XP, LINUX, Mac OS X, J2ME, Windows CE). Using a public API based messaging protocol, the client tier can exploit various applications that it is subscribed to.

A firewall/router 262 may be disposed in a communication path between the service tier and the client tier. In various embodiments the firewall/router may include functionality to support one or more platform services. Examples of infrastructure services that may be supported at the firewall/router 262 include intrusion detection, load balancing and Secure Socket Layer (SSL) control (termination, off-loading, etc.).

In the embodiment of FIG. 4 a data tier 280 includes one or more storage servers (294-298) each comprised of one or more control nodes and data nodes. The servers may be coupled to the service tier via an IP network executing a layered file server protocol such as Networked File Server (NFS) protocol or the like. A firewall 264 is advantageously disposed between the service tier 250 and the data tier 280 to further secure the data tier 280 against malicious access.

The service tier 250 is a web addressable data center comprised of a combination of hardware and software element including services, databases, routers and firewalls. The services include platform and infrastructure services 270 and an application service pool 250 comprising, for example, host/partner/extended services described above.

Each application in the server pool comprises software programs that implement services. In one embodiment, the software application is written as a SaaS servlet which operates in a web-browser environment. The SaaS servlet may be built and deployed using Apache/Tomcat running on JBOSS (or as Java Virtual Machine). SaaS servlets are stateless applications that can fulfill multiple requests from multiple tenants via request specific execution threads. Thus application services can be invoked via public APIs (REST or SOAP) that are processed by the API framework which receives client requests through the SaaS servlet.

Tenant Lifecycle Management

Although multiple clients are shown in FIG. 4, it can be appreciated that the clients may be associated with one or more tenants. The Services hosting platform of the present invention is a multi-tenant architecture in which customers share some or all layers of the stack. Multi-tenancy can apply to: 1) the application layer only; 2) the application and server/processing layers; or 3) the application, server/processing, and database tiers.

Figure 5:
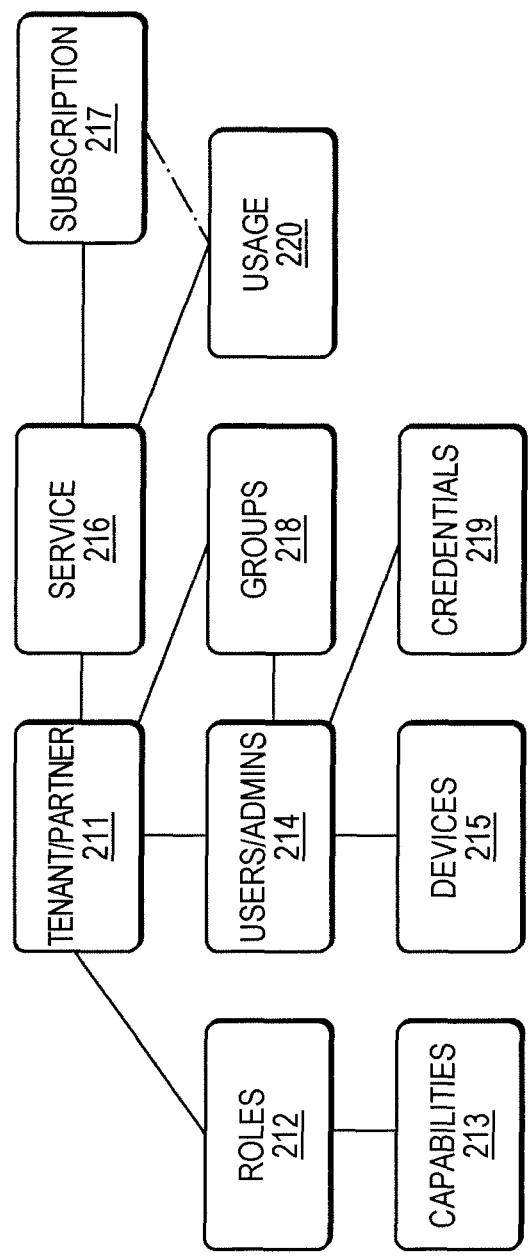
FIG. 5 illustrates exemplary components of a Tenant Lifecyle Management (TLM) data model that may be used to manage tenant data for tenants of the Services hosting platform of the present invention.

Appropriate delivery, monitoring and billing of services by tenants is accomplished through the use of a Tenant Lifecycle Management (TLM) data model. The TLM data model enables application services to: propagate tenant-level account data to the billing systems, create/modify/delete tenant accounts, customize tenant policy by providing policy operation codes for the tenant, define a hierarchical administration policy and provide operational, environmental and monitoring support. FIG. 5 illustrates an exemplary embodiment of a TLM core data model. For each tenant/partner there may be defined roles 212 and capabilities 213 for each of the roles. User/administrators may be associated with various devices 215, credentials 219, groups 218 and services 216. Each service 216 may have one or more subscription attributes 217, and usage 220 may be tracked on a particular service or subscription basis.

The TLM data model is use case and application independent, but may be leveraged to provide an application centric TLM model for each service. Certain APIs that may be associated with TLM, and which may be used to populate elements of the TLM data model include an AddUserProfile API (for bulk user registration/profile upload), a GetUserProfile API (to obtain user registration data) and an AdminPolicyConfiguration API to configure (security, subscription, and application) policies for a user.

Applicant Invocation Framework (AIF)

Each client that accesses an application service using the service hosting framework comprises an Application Invocation Framework (AIF) that is populated with a combination of external APIs, client stubs, client side handlers, and client side databases. The client may be a hardware network device, or may be a virtual client implemented using software.

Figure 6:
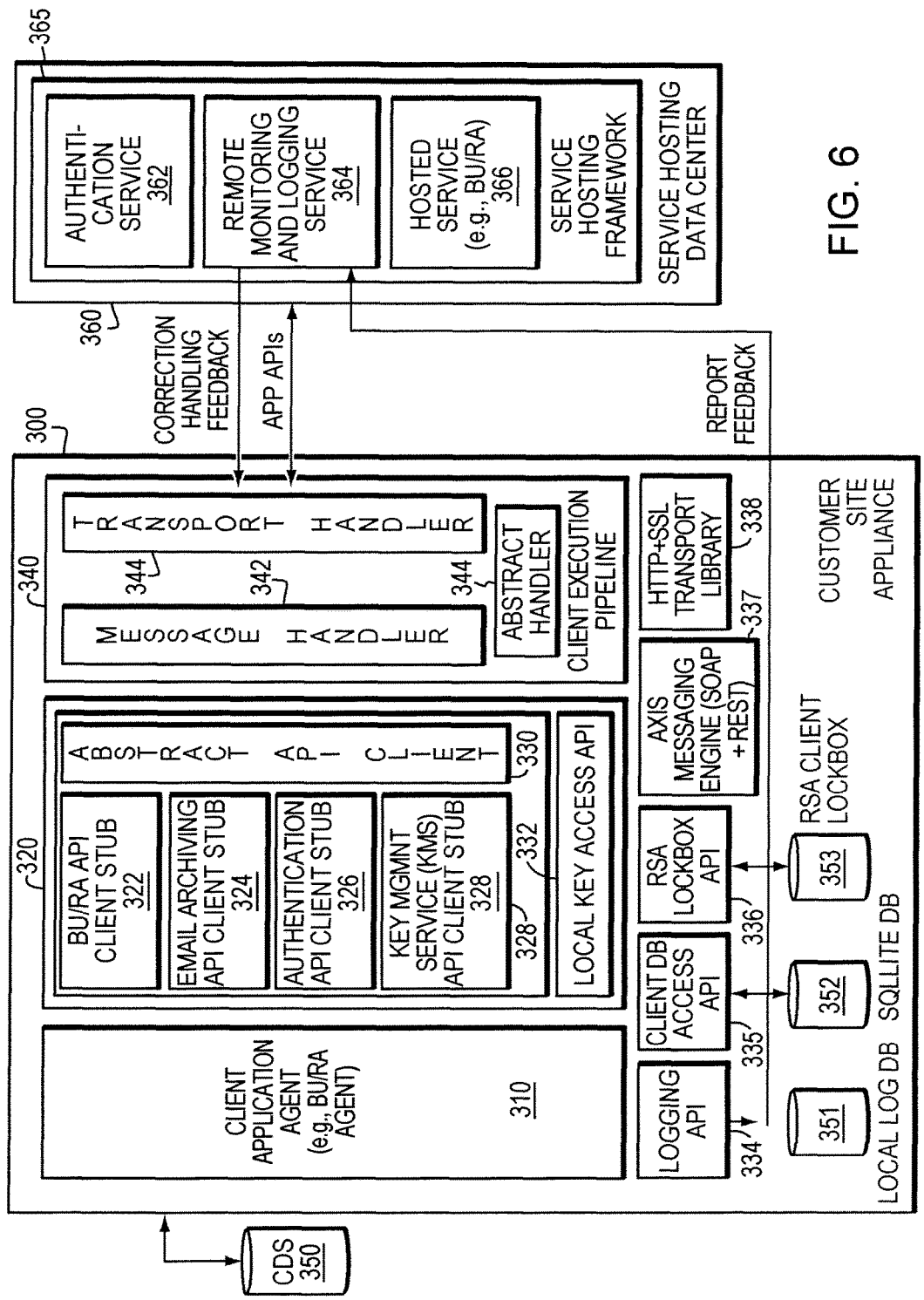
FIG. 6 illustrates an exemplary Application Invocation Framework (AIF) of the present invention.

An exemplary AIF architecture is shown in FIG. 6, embodied in a customer site appliance. The AIF comprises a client application agent 310, which may be comprised of plug-in modules, user interfaces and client-side handlers for supporting a service hosted by the services hosting platform. As will be described in more detail below, the client application agent 310 may be augmented The AIF also includes a services framework 320 which stores one or more client stubs (322, 324, 326 and 328) for associated application services as well as a plurality of external APIs 330. The client AIF may also include APIs to services which are at least partially locally hosted at the appliance, such as a local key access API, logging API, client DB access API, RSA Lockbox. An AXIS messaging engine 337 and an HTTP+SSL Transport Library 338 may be coupled to a client execution pipeline 340. The client execution pipeline comprises a message handler 342 and a transport handler 344 for communicating with the services hosting platform. In addition, the client execution pipeline comprises one or more abstract handlers comprising one or more APIs to the services hosting framework.

The AIF may use local storage on the appliance 300 to store databases associated with locally executed services. For example, the appliance may include a local error logging database 351, coupled to the logging service which provides real time error logging. An SQLite relational database 352 may be provided to store service resource utilization information. A lockbox database, such as an RSA client lockbox database, may be used to store key information provided by in response to invocation of the RSA lockbox service using its API.

The particular APIs, stubs and client handlers that populate each client applicance may differ, and may be obtained from the host servicing platform via a variety of different techniques. For example, the client may have obtained client software from the services hosting platform that includes information regarding exposed APIs that are used to invoke a service. In an alternate embodiment, the client may access the services hosting platform via a web browser; a web page associated with the services hosting framework displays service options to the client and downloads web pages on the client which included imbedded User Interfaces (UI) components (also referred to as widgets) which may be used to invoke service APIs via browser level interactions. In another embodiment as part of the registration process a thin client agent is downloaded to the client. The thin client agent may include one or more abstract handlers that include one or more APIs that augment the AIF of the client.

Whichever manner is used to provide the particular APIs that enable the client to access services of the services hosted framework, invocation of the respective services may be made via the authentication service 362, or directly to the hosted service 366 using a valid token.

The client appliance 300 is shown coupled to the services hosting data center 360. In FIG. 6 an authentication service 362, remote monitoring and logging service 364 and a hosted service 366 are shown by way of example. According to one aspect of the invention, the remote monitoring and logging service provides pro-active detection and repair of client problems which are logged at run-time via the logging API 334 of the client. For example, software upgrade failures or errors between client and the hosted application service are logged as they occur in the database 351. Error information may be propagated to the services hosting data center 360 via a report feedback path 371 using AXIS or other web messaging techniques. The remote monitoring and logging service, 364, upon notification of the issue with the client, selectively provides corrective actions, software updates and/or reconfiguration feedback to the client, for example in the form of a patch, updated client stub, or other handler to quickly resolve the service issue.

Figure 7A:
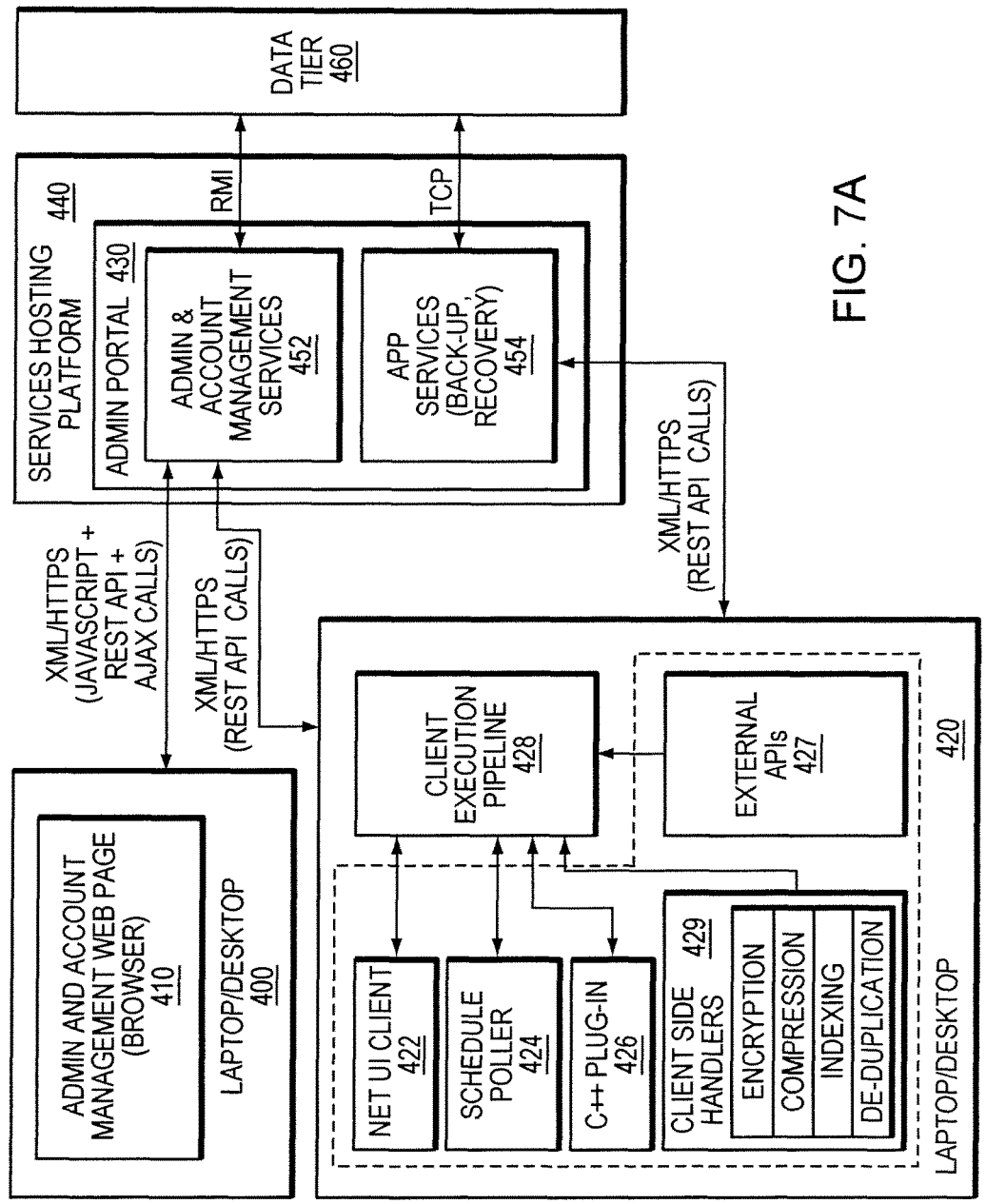
FIG. 7A illustrates exemplary modules that may be included as part of the client drivers and host driver associated with the application services hosting framework.

FIG. 7A illustrates an exemplary implementation of the client appliance architecture shown in FIG. 6, and is used to discuss, in more detail, the roles of a tenant administrator and the use of client side handlers.

In an embodiment where the services hosting platform forwards a thin service client application to the tenant, the thin client may include one or more client handlers. The client handler comprises pre-configured program code, customized for a particular tenant, which enables the client to locally execute at least a portion of the associated web service. The determination as to whether to implement a portion of a service at the SaaS data center or locally at a client is largely a matter of design choice. The decision to pre-configure and distribute a client handler occurs in a manner that is consistent with an administration policy of the tenant's organization. Examples of services for which client handlers may be generated and deployed include but are not limited to encryption services, compression services, indexing services and data de-duplication services.

FIG. 7A illustrates exemplary modules that may be included as part of the client drivers (400, 420) of the AIF and host driver (440) associated with the services hosting framework. The client drivers invoke various administrative and account management functions to manage the services offered by services hosting framework.

The drivers thus include the ability to perform admin and account management functions via local Client User Interfaces (UI) clients 422 or via a Web-based admin and account management application 402. In FIG. 7A, client 400 illustrates drivers for an administrative client of the tenant, while client 420 illustrates drivers that may be provided in a user client of the tenant.

The administrative client 400 executes a web browser including an administrator and accounts management web page. In one embodiment, the administrator can be used to enforce the policies of the tenant, for example through authentication and authorization of the users and selective key distribution to users. The administrator may also control the delivery of service schedules to the tenant users.

As shown in FIG. 7A, the Application Invocation Framework 425 (shown in dashed lines) includes client drivers such as a scheduling module 424, one or more plug-in adapters 426, as well as client side handlers 429 and a database of service associated external APIs 427. The scheduling module 424 may be used to store and execute the schedules associated with various client services (for example, to schedule a backup and recovery operation). The client plug-in adapters 426 include code that may be used by the client to precondition data for use on the host infrastructure. The application invocation framework 428 feeds the client service execution pipeline with one or more entry points and/or REST APIs that enable the client to invoke the web-services offered by the host. The entry points/APIs may be entry points and APIs to the services hosting framework, or alternatively may include entry points/APIs to locally stored service handlers, referred to herein as client side handlers 429.

According to one embodiment of the invention, the client side handlers comprise OS/platform independent run-time program code which permits the client to locally execute one or more functions associated with a web service. The client side handlers are deployed by the services hosting platform to the client when the client registers for a web service in a manner consistent with the policy of the tenant. Examples of client handlers include, but are not limited to, program code for encryption/decryption, compression/decompression, indexing and de-duplication.

It should be noted that the client side handlers may include entry points or APIs to the services hosting framework. For example, a client side encryption handler may access an encryption key for a tenant using a secure lock box service of the services hosting platform.

The application invocation framework is thus a low footprint database for storing APIs and other data particular to services subscribed to by the tenant, where low footprint' means that the amount of data that needs to be downloaded as the client agent is minimized.

Customization of the application services by the client may be attained through local customization of the client agent (for example, by altering backup schedules, etc.). Other customizable aspects of a client driver may include, but are not limited to, client side caching, encryption capability and policy management capability.

Figure 7B:
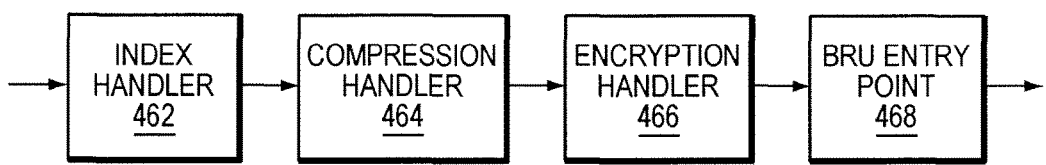
FIG. 7B illustrates an exemplary client service invocation pipeline that invokes several client side handlers.

The client execution pipeline 428 thus provides, for each service, a linked list of one or more entry points to services host framework and client side handlers. FIG. 7B illustrates one example of a client execution pipeline associated with a backup and recovery service. A client side indexing handler 462 calculates an index for data to be stored by the services hosting platform. After the index is calculated, a client side compression handler 464 compresses the data, and forwards the data to an encryption handler 464. The encryption handler 464 may invoke a service to retrieve the encryption key associated with the tenant from a lock box on the services hosting platform. Once the client has the encryption key, the encryption handler encrypts the data, and forwards the data and index to the services hosting platform by invoking a Backup and Recovery (BRU) service using a REST API call. As a result, data secured before it is forwarded over the wire, while still allowing the services hosting platform to provide the backup and recovery functionality.

Figure 8:
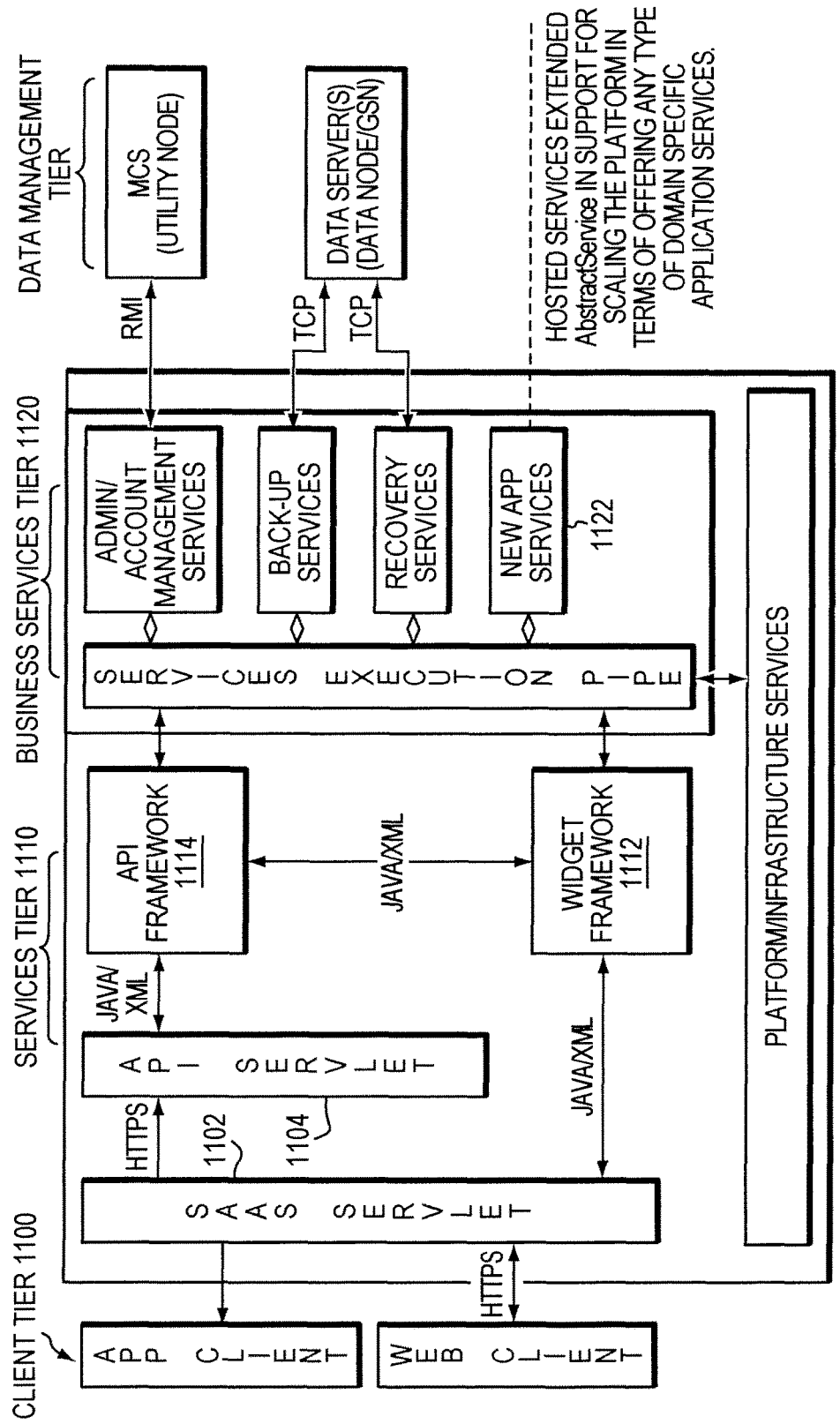
FIG. 8 illustrates an alternate perspective of the Services hosting platform of the present invention.

FIG. 8 is another block diagram of a services hosting platform, illustrating several components that facilitate end to end message flow. For example, the services hosting platform includes a client tier 1100, a services tier 1120, a business tier 1130 and a data tier 1140. The client tier 1100 includes any tenant client, including web based clients and application clients as well as remote and local clients. In essence any client capable of communicating via the Internet with the service tier 1120.

Depending upon the protocol of requests from the client tier, requests may be processed using either API servlets 1102 or SaaS servlets 1104 and forwarded to one of an API framework 1112 or Widget framework 1114 (where a Widget framework is a SaaS servlet related service library). Requests from the Widget framework are translated and forwarded to the API framework 1112, and used to identify the entry point to the web service to retrieve the service instance from the business services tier 1120.

As described above, the business tier 1120 may include a variety of host services, (such as admin/accounting services, backup services and recovery services), but also new services 1122 may be linked into the business tier 1120 by the services hosting framework. The 'new' service may be a SaaS service, or may be a legacy service, which is assigned an entry point by the services hosting framework, and invoked via the plug in adapter 16 (FIG. 1). To add a service to the business services tier 1120, a services pipeline for the service is built by linking the servlets associated with the service handler and incorporated platform/protection/infrastructure services using AOP techniques. An API is associated with the new service is then forwarded to the Application Framework API to expose the service to the client/tenants.

Accordingly an extensible services hosting framework has been shown and described that enables dynamic deployment of web-services that invoke services from a re-usable multi-tiered service pool. One feature of the extensible services hosting framework lies in its rich set of infrastructure, platform and security and privacy services. The service set may easily be leveraged by applications to decrease the time associated with developing, deploying and maintaining high quality services in a cost effective manner. Several exemplary services that may be provided as part of the services hosting framework will now be described in greater detail with reference to a web service request and response pipeline.

Services Execution Pipeline

Figure 9:
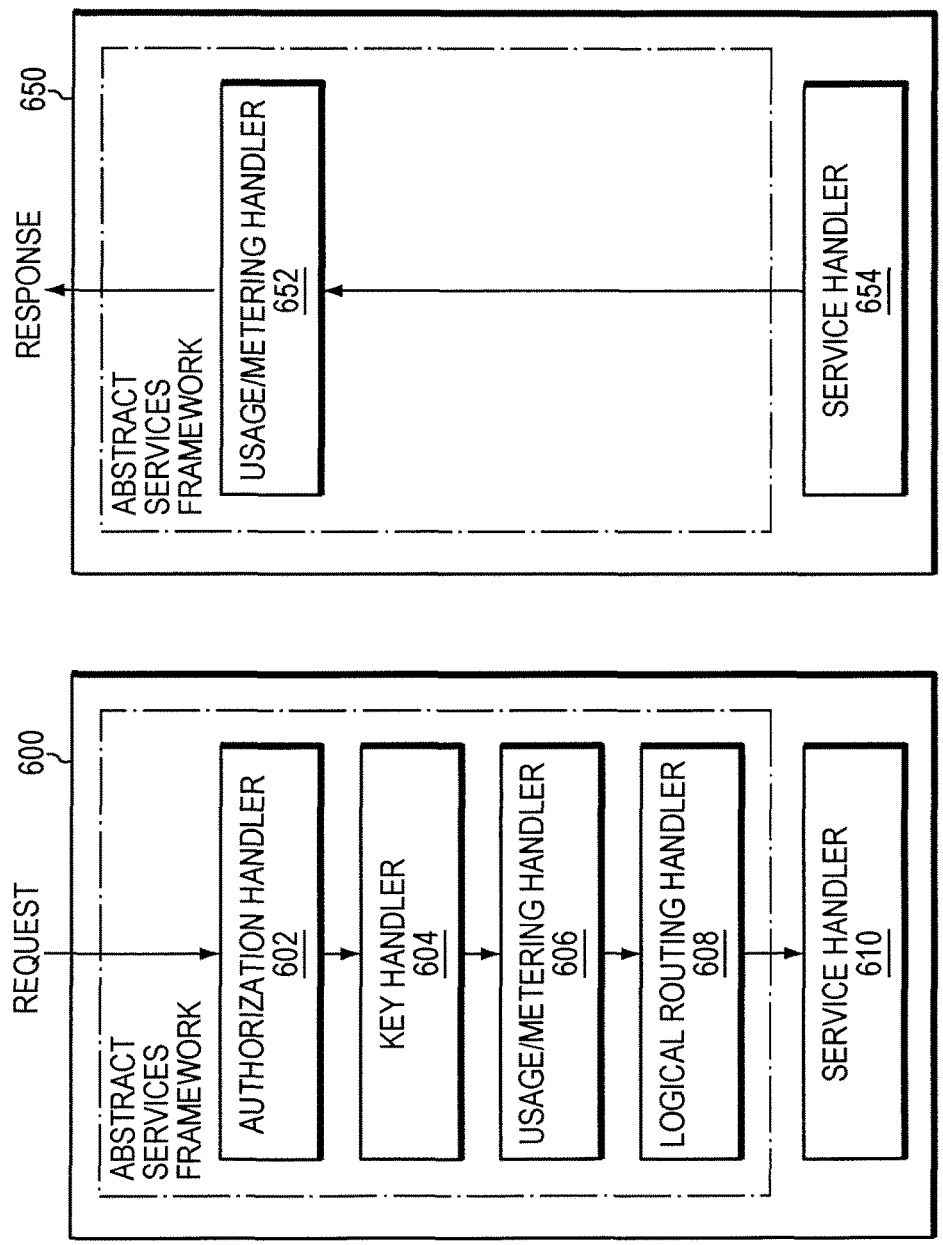
FIG. 9 illustrates a request and response service pipeline which may be associated with a web service supported by the Services hosting platform of FIG. 1.

As mentioned above, the service execution pipeline is configurable. FIG. 9 illustrates only a representative set of handlers that may be included in the pipeline and is used as a springboard to discuss an exemplary flow which includes several security and privacy services. Thus FIG. 9 illustrates exemplary handlers that may be included in a respective request and response service execution pipelines 600 and 650 for executing a web service associated with service handlers 610 and 654.

Authorization Service Handler

When a request is received from a tenant, an authorization handler 602 is first used to verify that the tenant has the ability to access both the service and the data associated with the service. A typical flow that accesses the authorization handler to obtain tokens was described above in FIG. 3. According to one aspect of the invention, the authorization handler is one of the security and privacy services which is publicly exposed for use both by tenants and by application to secure content.

Figure 10:
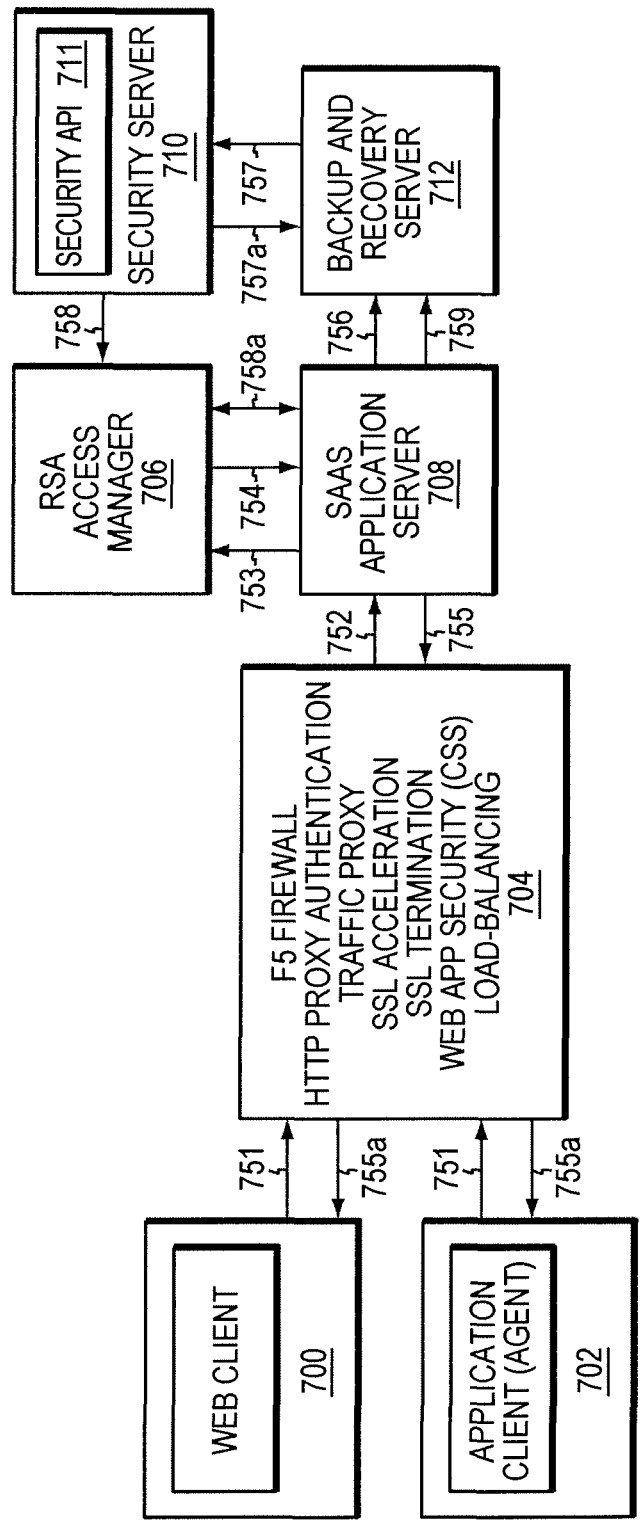
FIG. 10 illustrates exemplary modules that may be provided in an authentication process of the host security service.

FIG. 10 is a more detailed diagram illustrating exemplary services that may be invoked by an authentication handler of the present invention. Steps that may be performed in the authentication process, described broadly in FIG. 4, are indicated by numbered arrows in FIG. 10. At step 751 the client sends a request with credential or cookie in HTTP/S. The F5 firewall 704 Proxies authentication for client against the host SaaS Server 708 at step 753 to the SaaS server RSA Access Manager (AM) 706 for authentication and passes the credential. At step 754 RSA AM 706 authenticates client and returns an authentication token/session. The token may be an HTTP encrypted token which will be available to the service framework (i.e., will have a copy of RSA security token) and can also be accessed on-demand (if needed) from the RSA Access Manager. At steps 755/755a the SaaS server returns to client a F5 session (via firewall 704) which gets dropped on user machine as a cookie (for browser client) or token for Application client.

In one embodiment, at step 756 SaaS server 708 accesses the RSA generated security token (of the authenticated user) and wraps (or "mints") it into a Security Authentication Token consisting of following components: {RSA-generated security token, hash of the services hosting platform-specific operation ID} where operation ID should be a unique identifier of 2 bytes. The SaaS server 708 forwards the Security Authentication token to a backup and recovery Server 712 in a Request Message with the following security parameters {userID, services hosting platform Auth Token} each of which will be 32-bytes.

At steps 757/757a the backup server 712 invokes a Security API (which may implement Java Security Provider Interface) hosted on dedicated Security App Server 710 to validate services hosting platform Authentication Token. When the token is verified, the security server and returns authorizations/privileges/roles via RSA AM (758, 758a).

In one embodiment the Security API arguments may be in the form of (userID, authToken, activityID) and return value(s) from the API may be a boolean value indicating whether the user is authorized for the activity and optionally the access rights of the user. For example, the security API may be the Role Based Access Control APIs described above. The Security API may be used to validate that the security token is not expired and is valid. The Security Server 710 where the Security API is hosted may be coupled via a dedicated VLAN such that the address of the Security server is configured by the backup and recovery system.

Referring back to FIG. 9, once the client is authenticated, a key handler 504 is invoked to obtain an encryption key for use by the client. The process of obtaining an encryption key is described in FIG. 11.

Key Handler

One feature of the host security service of the present invention is its ability to provide an end-to-end secure path for user data. In an enterprise environment when various tenant users may be geographically distributed, key distribution and version management are integral to the security solution. In a storage environment which executes a backup and recovery services it is important that users which retrieve backed up data have access to the same key that was used to encrypt the backed up data.

Figure 11:
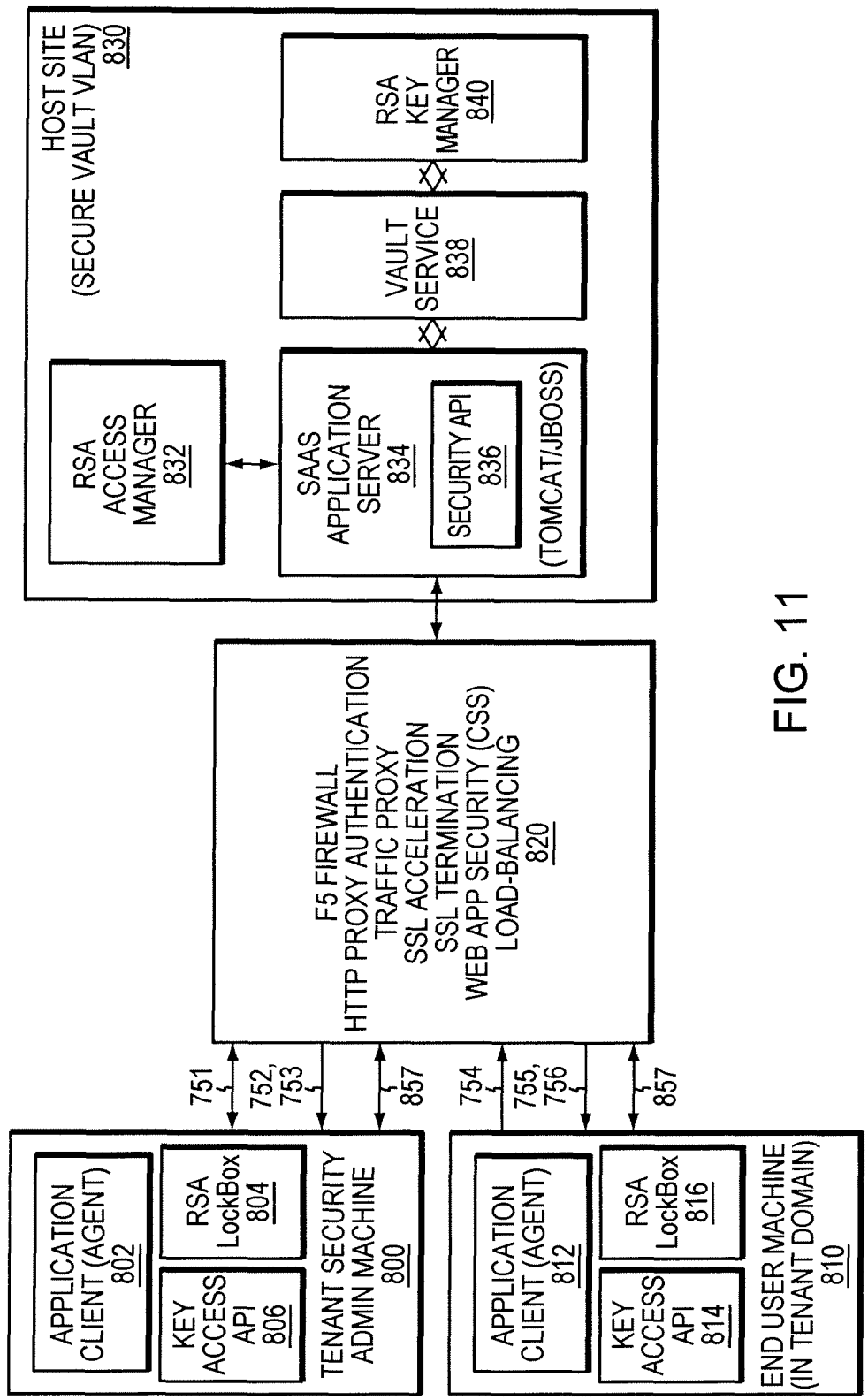
FIG. 11 illustrates exemplary components that may be included in client agent and host agent drivers to support a key generation and distribution service of the present invention.

FIG. 11 illustrates exemplary software modules that may be included in client agent and host agent drivers to support key distribution by a host security service using the services hosting framework of the present invention. FIG. 11 will be used to describe an exemplary key distribution process of a host security service, with steps of the process being illustrated by numbered arrows in the figure. Each client agent, whether an administrator or a user, includes a thin client, a key access API and an RSA LockBox module (a cross-platform toolkit for data encryption).

For convenience a firewall 820 may perform certain security functions for the host security service, although it is not a requirement that a firewall be used. As shown in FIG. 8, the firewall may include functionality such as an HTTP Proxy Authentication, Traffic Proxy, SSL Acceleration, SSL Termination, Web App Security (CSS), Load-balancing, among other functions.

The host site 830 is shown to include an RSA Access Manager module 832, an application server 834 including the security service 836, a Key Management Service (KMS) 838 and an RSA Key Manager module 840. RSA Access Manager comprises access management software that enables organizations to provide secure access to Web applications within intranets, extranets, portals and Microsoft Exchange infrastructures with transparent, SSO (single sign-on) access. RSA Access Manager also helps manage multiple user groups while enforcing a centralized access policy that protects enterprise resources from unauthorized access. RSA Key manager includes key lifecycle management capabilities.

The Key Management Service (KMS) 838 is a new service provided as part of the services hosting framework of the present invention. The Key Management Service is an optional, use-case independent on demand service which may be used to generate a new encryption key for a new tenant, securely back-up au encryption key in a secure Vault, distribute an encryption key to a user's laptop/desktop where it is stored securely in a local client side key store and retrieve the encryption key from the Vault if the client machine is corrupted over an authenticated HTTP connection.

The Key Management Service (KMS) may be deployed by the host servicing platform, a third party site or at a customer site. KMS capabilities are exposed to clients via a use-case independent API. It is anticipated that any invocation of the KSM is only permitted, following authentication and authorization of the calling tenant. To use the KMS, the client should have the ability to store and protect the encryption key, for example using an OS/platform independent key store such as RSA lockbox. (RSA lockbox may be deployed to the client as a thin client side handler during registration for the KMS).

Before accessing any host service, the tenant administrator registers with the host. During a typical registration process, a customer provides customer data on registration pages of the host and receives an invitation from the host to select and customize their service. Following registration, at step 851 the tenant administrator registers with the host service, authenticates itself via the firewall using a process such as that described in more detail in FIG. 10. Following authentication, the administrator downloads and installs the security service handler, which includes an API to the KMS 838. At steps 852 the client administrator agent transparently invokes the KMS 838 and at 853 the KMS generates the encryption key (either AES-128 or 256-bit) for the tenant, stores the back-up copy of new generated key in RKM 840, and at step 853 sends back the encryption key to the Agent that is being installed in the Administrator's machine. The key is stored using RSA Lock Box 804 by the client administrator agent.

At step 854 a new user for the tenant authenticates itself with the host service and downloads the thin security service client. At step 855 the security service client retrieves the key for its associated tenant from Vault 838 and stores the key in is RSA Lock Box 816.

Once the key is stored in the client Lock Box 816, the client may initiate services which use the key, such as a backup and recovery service.

Accordingly a key management and distribution service has been described that centralizes key management to enables intelligent encryption brokering (by ensuring that tenants always have access to appropriate keys) as well as intelligent key management (through authentication of users).

Usage/Metering Handler

Referring back to FIG. 9, the after a tenant has been authenticated and keys have been distributed, the tenant is able to use any of the other platform, infrastructure or host services that are available on the services hosting platform. These services are described in detail in FIG. 1. Several of the platform services (such as billing and service level management) involve monitoring the utilization of host infrastructure resources. A usage/metering handler 606 may therefore be included in the services execution pipeline to provide real time usage information.

The usage/metering handler 606 allows for virtual real-time tracking of message exchange and resource utilization. As shown in the TLM data model of FIG. 5, usage tracking can be performed on a service, subscription, tenant or user basis. Certain process oriented services must keep track of message exchanges between the client and the SaaS services; the usage/metering handles enables intermediate message exchanges to be tracked in real time in order to collect overall usage data for the particular process. Usage data may be tracked at a user/resource granularity by session tracking using the services pipeline. As a result, various services, including SLM, TLM and billing services, can accurately track process flow and resource utilization.

There are various methods that may be used to obtain real time usage data using the services hosting platform. In one embodiment, when the client service pipeline is executed, header fields: BACKUP_START (and BACK_END) are inserted into the client HTTP/S message that is forwarded to the host services platform. The host may intercept the HTTP/S messages, and tracks messages of type=BACKUP_START and BACKUP_END. The host may use these indicators to log the events, and track usage between receipt of the messages. It will be appreciated that such a feature allows real-time usage and other statistics to be tracked at both a client and tenant granularity. Application associated information may be asynchronously aggregated with application independent information to track resource utilization across multiple tenants.

Thus the usage/metering service may be incorporated into the services execution pipeline to extend any web service. For example, resource utilization may be monitored to determine when and whether to scale the storage or increase buffer cache size. Alternatively, the usage tracking may be used to improve billing and otherwise monitor use of the resources by the particular tenant. Thus the usage/metering service is merely one example of a platform service that may be re-used by any web service to enhance the service. In addition it should be noted that by providing a consistent usage/metering service across the web services platform, cross web service cooperation is facilitated because the cooperating web services can rely on the fact that they are looking at statistics or other data that is gathered in a consistent fashion.

Logical Routing

A logical routing handler 608 is shown included in the request services execution pipeline 600. The logical routing handler in one embodiment is provided as an infrastructure service that may be selectively incorporated in a services pipeline to decouple the services hosting framework from the storage backend infrastructure. The logical routing service may be used to transparently relocate customer data for disaster recovery or de-duplication services and to transparently scale storage provided for a tenant as the tenant needs increase or decrease.

The logical routing service is an example of a service that is customizable on a tenant and user granularity. The logical routing service can be used to link the application services hosting framework to a wide variety of host infrastructures from legacy back ends to grid storage arrays, disaster recovery platforms, etc. The logical routing service can be used to scale tenant storage and/or move tenant data without modifying other aspects of the tenant's services. The ability to decouple of the back end infrastructure from the application services hosting framework facilitates business continuity and increases the overall value of the platform.

Figure 12:
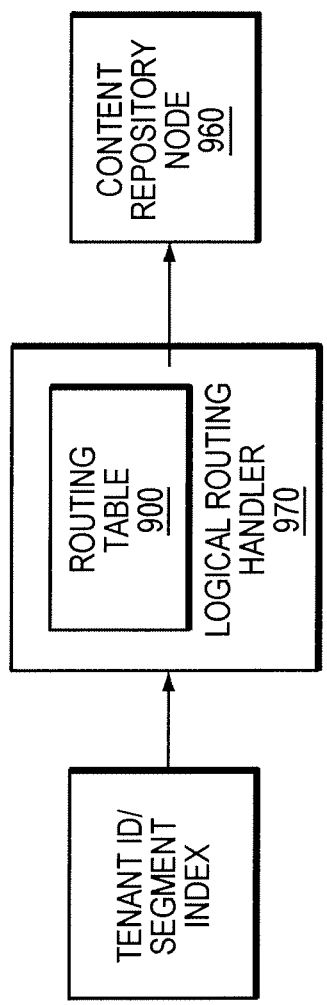
FIG. 12 is a diagram of a logical routing service that may be provided as an infrastructure service for assisting other services that execute on the host infrastructure.

For example FIG. 12 illustrates several exemplary components that may be associated with a logical routing service. The components may be implemented in any combination of hardware or software, and may use data structures that are stored on a computer readable medium in the host infrastructure.

The logical routing handler includes or is otherwise coupled to a routing table 900 which is indexed using a Tenant ID/segment index and outputs an index to a content repository 960. The content repository 960 may be a storage device having any configuration, and may be used to manage both data and metadata. In such an embodiment, the logical routing handler may be used to generate an index to the content repository, using the metadata.

Although FIG. 12 illustrates a simplified version of a routing table, it is understood that the routing of requests may use any variety of variables in determining an appropriate data location. The present invention is not concerned with the contents of the routing table, but rather is directed at the notion of abstracting the routing function into a logical service handler that may be selectively invoked in accordance with the needs of an underlying service. For example, a disaster recovery service is one example of a service which would benefit from the use of a logical routing service to transparently direct customers to the disaster recovery site in the event of failure at the services hosting data center.

Accordingly an extensible services pipeline and method of building an extensible pipeline to add value to an application service through augmentation with platform services in a cost effective manner has been shown and described. The particular pipeline of FIG. 9 leverages existing platform security and privacy services, such as authentication and authorization services to provide a robust security solution in a multi-tenant SaaS environment.

Although the security and privacy services are shown with regard to a particular service handler, it should be recognized that the services may be used in a consistent manner to protect content before it is backed up on the wire, before archiving the content on the wire and before storing the content on the wire. Using the security and privacy services in a consistent manner across different web services facilitates administration while ensuring that data and applications are protected.

Appliance Content Protection

Figures 13A, 13B:
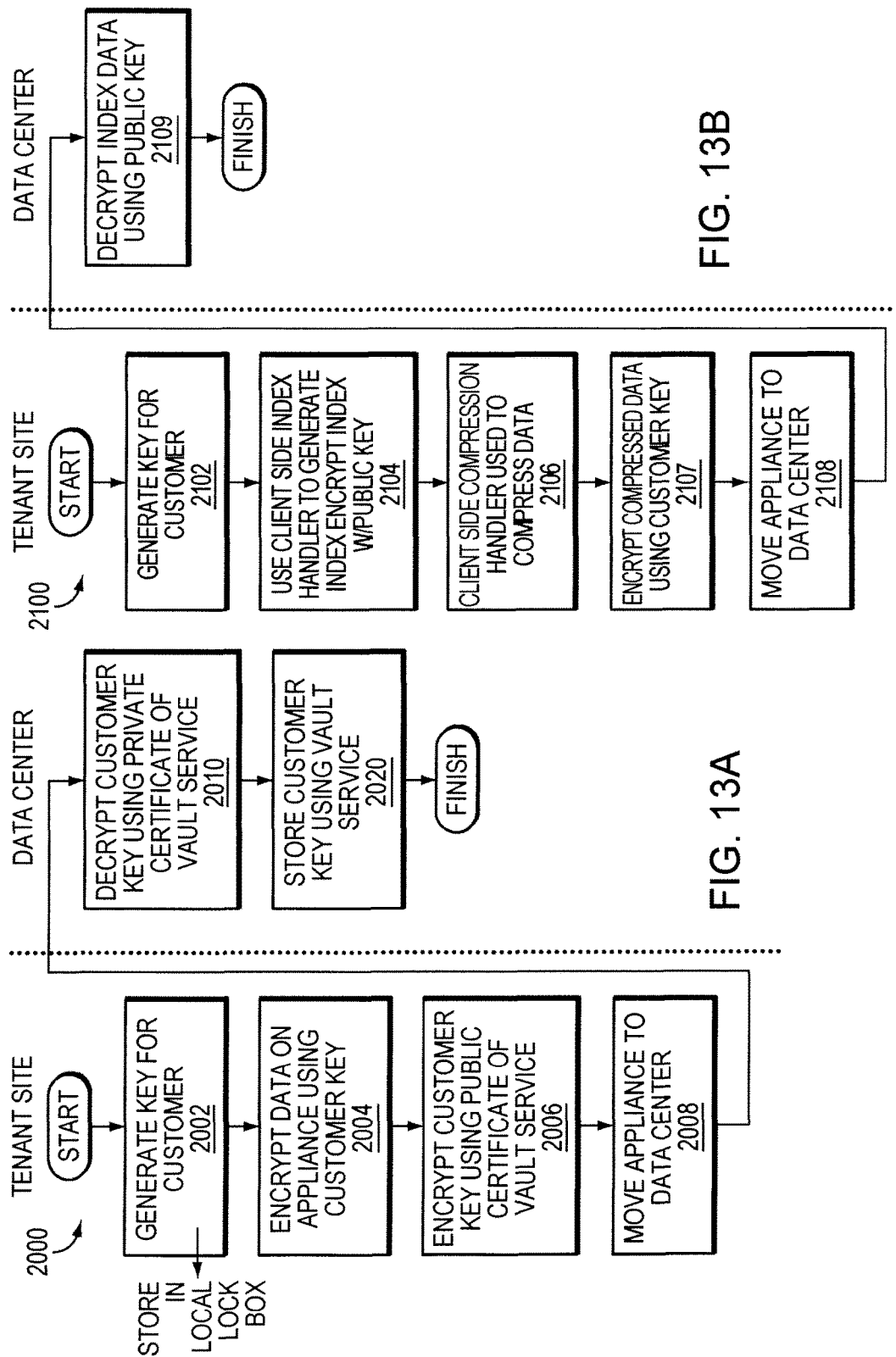
FIGS. 13A, 13B and 13C are flow diagrams provided to illustrate exemplary steps of performed in several processes for securing data transferred on an appliance using services of the present invention.
Figure 13C:
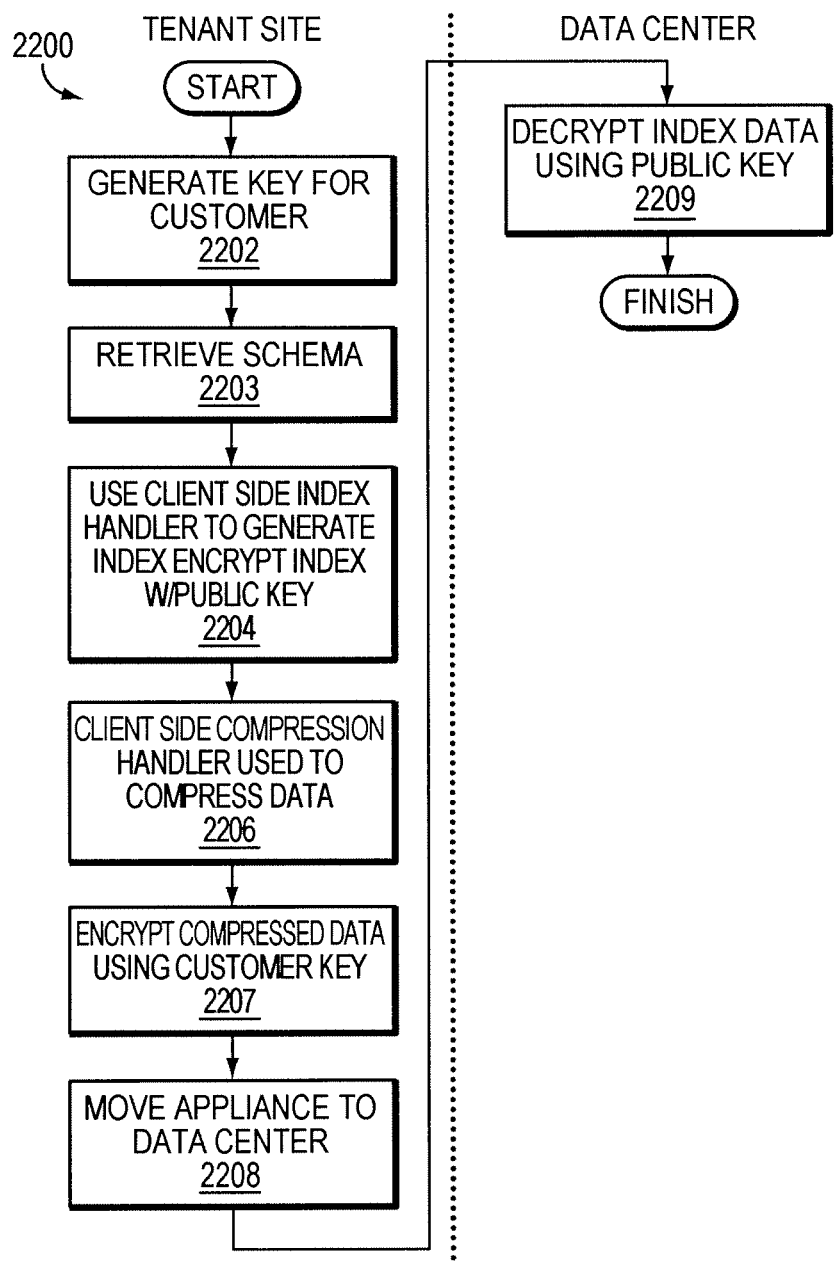

Referring now to FIGS. 13A, 13B and 13C, it will be recognized that when there is a large amount of data to be backed up it is often not feasible to perform each backup over the wire. As such, backed up data is typically 'seeded' with initial data, with incremental backups being performed periodically. The seeded data is generally copied, from local storage, onto a storage appliance which is physically transported to the host data center.

In addition, because the data set is typically large, the data set is managed through indexing. Indexing reduces the amount of time needed to search a large database by allowing a file system to search the indexes to identify the particular volume in which data of interest may reside.

It is important that the data that is transported on the appliance is secured prior to transport. Thus the data must be encrypted prior to transport. FIGS. 13A-13C illustrate exemplary processes 2000, 2100 and 2200 that may be performed to secure data on an appliance prior to transport of the appliance to a data center. Each process secures data prior to transport of a seeded data store to the data center. One distinction between the processes lies in the fact that in processes 2100 and 2200 the key that is used to secure the data never leaves the customer site, and thus there is no risk that the content can be compromised at the SaaS data center. As will be described in more detail below, one problem with not allowing the key to leave the customer site is that index of the data set must be generated prior to the encryption of the data at the customer site. The processes of FIGS. 13B and 13C provide mechanisms for indexing at the customer site.

However, in FIG. 13A, during process 2000, at step 2002 a new AES-256-bits encryption key is generated specifically for the customer. At step 2004 The AES-256-bits encryption key is used to encrypt the content that has been loaded in the appliance. At step 2006 the customer key is encrypted using the public key encryption certificate of the Key Management Service, for example using an encryption service such as the RSA 2048 bit public encryption algorithm.

The steps 2004 and 2006 will result in protecting both the content that needs to be backed-up for seeding the back-up of large capacity data sets at customer site and also protect the backed-up copy of the newly generated AES customer encryption key.

At step 2008, the appliance is moved to the data center. On the data center side, at step 2010 the private key corresponding to public certificate of the Key Management Service is used to decrypt the AES 256-bit customer key encryption key. At step 2020 the decrypted customer key may be backed up and made accessible to the customer via Key Management Service for subsequent encryption of content via client-side back-up and recovery operation at which the client is deployed.

Referring now to FIG. 13B, it is a goal of this process to secure the customer data so that the encryption key is not transferred to the data center. To accomplish such a feat, the data must be indexed at the client site prior to encryption using a private key of the client. The index can then be passed to the data center (using a secure key known to the data center) to enable file system manipulation using the indexes without compromising data security.

For example, during process 2100, at step 2102 the customer key is generated. At step 2104, a client side index handler generates the index for the client data, and encrypts the index using a public key. At step 2106, the client side encryption handler encrypts the client data using the client key and at step 2108 seeded data set, including the encrypted index and data are forwarded to the SaaS data center. At step 2109 the data center can decrypt the index information using the public key, and use this to manipulate the data, while never actually being able to read the data. With such an arrangement, secure data transport is provided which ensures that a customer key is kept local to the customer site.

The process of FIG. 13B is effective when the client is able to easily generate the required indices; however, there are many different types of indices that may be needed by a SaaS service. Content can be indexed using a variety of methods. For example, content may be indexed based on the generic and system level aspects of the underlying content. For example, an email can be indexed based on sender address, recipient address, sending time, MTA address, subject, size, etc. Or on document indexes, such as type of document, file extensions, etc. size of document, when it was last modified, creator of the document. A second method of indexing involves free text indexing of content, via a standard free text indexing such as Apache Lucene. Another way of generating indexes is based on content schema; i.e., the underlying structure of the document. For example, a calendar event, email invite, tax filing, email invite, etc. The structure of the file corresponds to the schema, where the schema is a data model that represents the relationships between elements of the data set.

The schema is an input to a parser of an indexing engine, as it provides context for the different elements of the data, i.e., it tells the parser how to interpret the data set. Indexes to the data can then be generated, where the indexes may be related to the particular schema, or may use the schema to interpret the data to provide the generic and system level, or other types of free text ones.

One problem with this situation is that the schema, while known to the SaaS service, is not generally known by the client. Thus, while the client has access to the content, it does not necessarily know how to generate the desired schema indices for the content.

The steps performed by process of FIG. 13C overcome this problem by transferring the schema to the client, for example as part of an index client handler. Thus at step 2202, the private key is generated for the customer, and at step 2203 the client retrieves the schema from the SaaS server. The Schema retrieval request may be in the form of an exposed API. At step 2204, the client side uses the schema with the index handler to generate indices for the content and encrypts the generated schema indices using the public key. At step 2206, the compression handler compresses the data. At step 2207 the encryption service encrypts the compressed data using the private key from step 2202. The content and index can then be transferred to the data center, where at step 2209 the schema index may be decrypted using the public key and used by the SaaS service.

Various Use Case Embodiments

Figure 14:
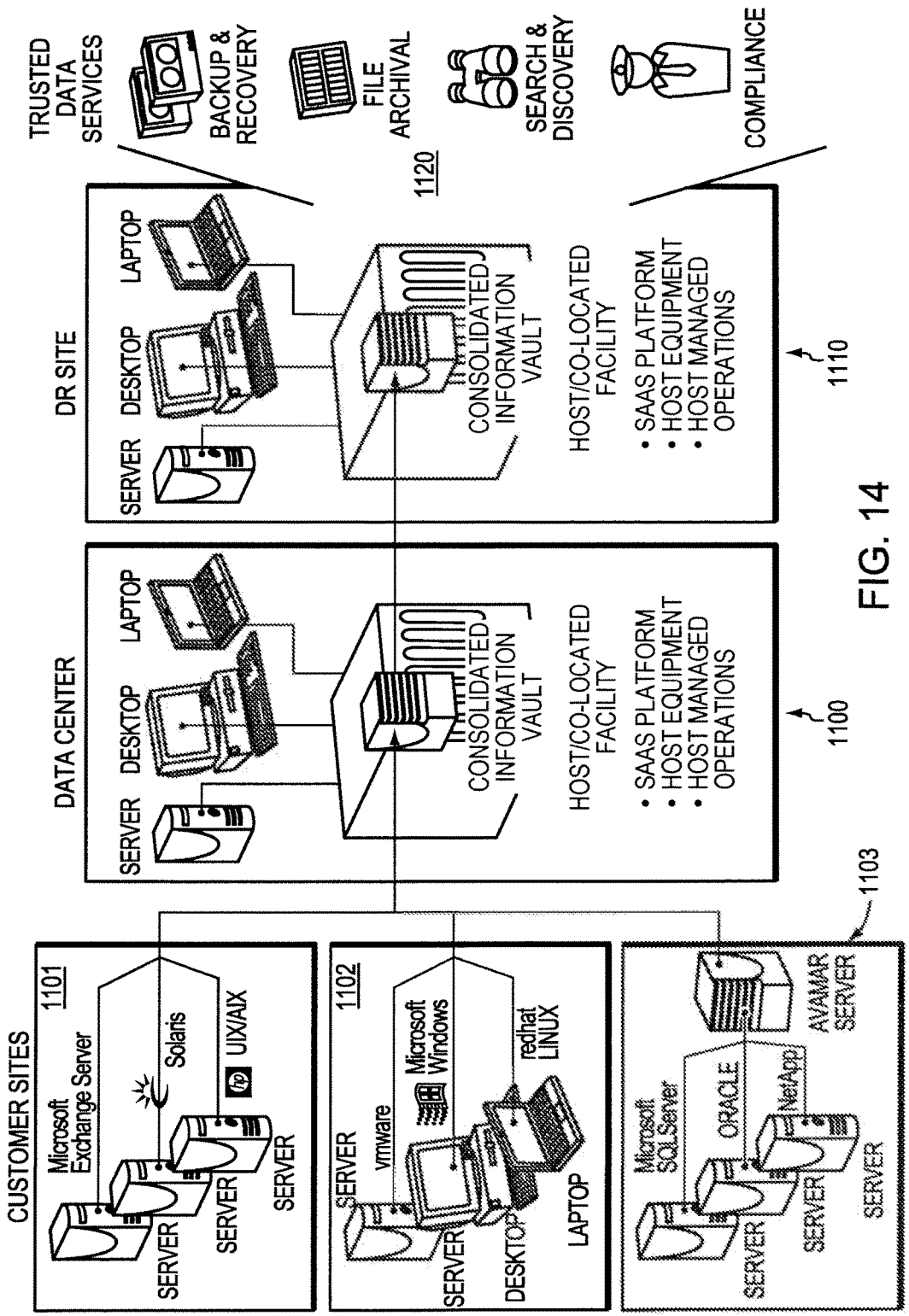
FIG. 14 illustrates an exemplary host infrastructure in which the services hosting framework of the present invention may advantageously be employed.

FIG. 14 illustrates an exemplary host infrastructure in which the services hosting framework of the present invention may advantageously be employed. A Disaster Recovery (DR) solution includes a Host data center 1100 and a DR data center 1110. Each data center includes a services hosting framework and host infrastructure including Host Equipment and Host Managed operations. Customized versions of services 1110 are deployed by the clients 1101-1103. Although a storage system has been shown and described it should be understood that the services hosting framework of the present invention may be adapted for use in many different service environments.

Although the embodiment of FIG. 14 illustrates a number of trusted data services that may be associated with the host infrastructure, it should be understood that the services hosting framework is not limited to any particular type of services. Rather, as discussed above, the services hosting framework of the present invention is extensible and can readily integrate new services as they become available from a host, partner or other source.

Figure 15:
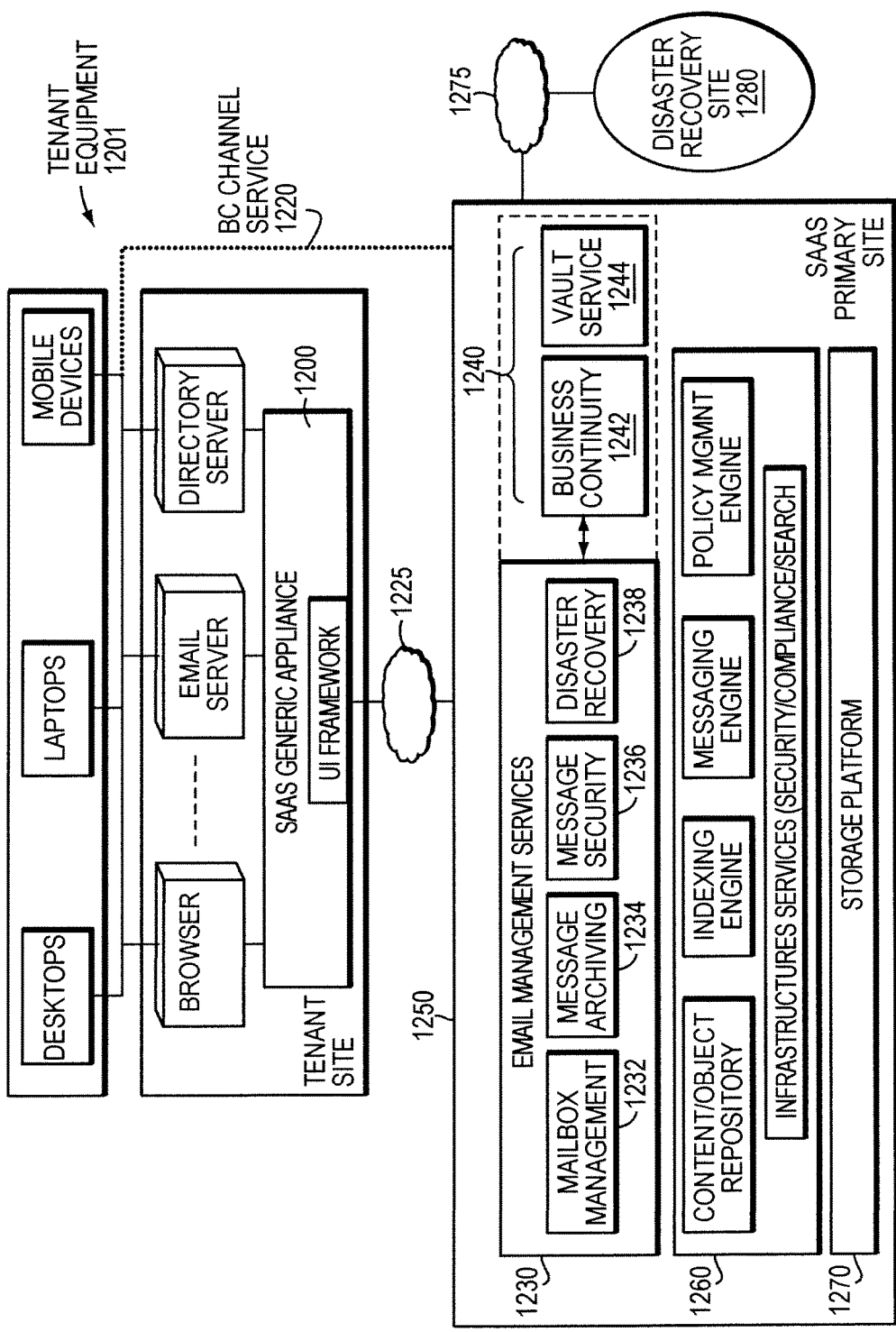
FIG. 15 illustrates an exemplary embodiment of the Services hosting platform of the present invention adapted to offer an extensible service.

Referring now to FIG. 15, an example of an IT service that may be added as the extensible service 15 of the services hosting framework of FIG. 1 is an email management service 1230. Email management services include a mailbox management component 1232, a message archiving component 1234, a message security component 1236 and a disaster recovery component 1238. As shown in FIG. 12, the email management service includes a host component 1230 and a tenant component 1200.

The generic SaaS tenant appliance 1200 includes a SaaS User Inteface (UI) agent framework that is deployed at the tenant equipment for managing the services for which the client has registered, where, as mentioned above the client side framework agent may be comprised of client invocation pipelines invoking SaaS handlers and client side handlers. For an web email service the appliance or agent 120 facilitates transfer of email from the tenant site to the email service 1230 that is provided by the platform 1250. The platform forwards the message to the destination while archiving the message using an archiving service 1234. In addition, the platform may also invoke a security service 1236 to authenticate the messaging client, and invokes mailbox management services to properly store the message.

According to one aspect of the invention, and IT service, such as an email management service may be exposed to the client by providing APIs to the components of the service. Thus, in the embodiment of FIG. 14, the services hosting framework could expose a mail box management API, message archiving API, message security API and email disaster recovery API to the tenant, enabling the tenant to enable the tenant to use the services. In the event that the email management service 1230 is updated, and more services are provided, the APIs to those services would also be provided to the tenant.

As shown in FIG. 14, the email services 1230 may also utilize security and privacy services 1240 such as business continuity service 1242 and Key Management Service 1244 to protect access to data. For example, in the event of that the failure of the appliance 1210 or the network connection 1225 makes the tenant unable to access the local copy of email, the email can still be retrieved from the archive using the APIs associated with business continuity service 1220.

In addition to the business continuity service, the email management services may also use the Key Management Service 1244 to store encryption keys that secure the emails. As described above with regard to FIGS. 10 and 11, the encryption keys may be retrieved and stored locally in a lockbox of the tenant for email decryption.

Accordingly an extensible services hosting framework has been shown and described which facilitates the dynamic deployment of customized services in a multi-tenant environment and enables multi-organization personalization. New and legacy services may easily be integrated into a host infrastructure by exposing associated APIs to the tenants. Any of the services may take advantage of existing protection, infrastructure and platform services to enhance the performance and capabilities of their services.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method of managing tenant data that is transferred on a storage medium to a host data center, comprising:
   generating, using at least one processor, a custom key for the tenant, wherein the custom key is customized to the tenant, and wherein the custom key controls use of at least one service provided by the host data center out of a plurality of services provided by the host data center;
   encrypting, using at least one processor, at least a portion of the tenant data using the custom key, wherein the custom key controls access to the encrypted tenant data;
   encrypting, using at least one processor, the custom key using a public key provided by a public certificate of a Vault Service provided by the host infrastructure;
   storing the encrypted custom key and the encrypted tenant data on the storage medium; and
   after storing the encrypted custom key and the encrypted tenant data on the storage medium, physically transferring the tenant data to the host data center when the storage medium is transferred to the host data center;
   decrypting the custom key using a private key corresponding to the public key;
   decrypting the tenant data using the custom key; and
   following physically transferring the tenant data to the host data center, securely backing up the custom key at the host data center using a key management service that makes the custom key available to the tenant following authentication and authorization of the tenant.

2. A method of managing tenant data that is transferred to a host data center, the method comprising:
   generating, using at least one processor, a custom key for the tenant, wherein the custom key is customized to the tenant, and wherein the custom key controls use of at least one service provided by the host data center out of a plurality of services provided by the host data center;
   encrypting, using at least one processor, at least a portion of the tenant data using the custom key, wherein the custom key controls access to the encrypted tenant data;
   encrypting, using at least one processor, the custom key using a public key provided by a public certificate of a vault service provided by host infrastructure;
   storing the encrypted custom key and the encrypted tenant data on a storage medium;
   after storing the encrypted custom key and the encrypted tenant data on the storage medium, physically transferring the tenant data to the host data center when the storage medium is transferred to the host data center;
   decrypting the custom key using a private key corresponding to the public key;
   decrypting the tenant data using the custom key; and
   following physically transferring the tenant data to the host data center, securely backing up the custom key at the host data center using a key management service that makes the custom key available to the tenant following authentication and authorization of the tenant.

3. A non-transitory computer readable storage medium storing computer software that manages tenant data that is transferred to a host data center, the computer software comprising:
  executable code that, when executed on a processor, generates a custom key for the tenant, wherein the custom key is customized to the tenant, and wherein the custom key controls use of at least one service provided by the host data center out of a plurality of services provided by the host data center;
  executable code that, when executed on a processor, encrypts the tenant data using the custom key;
  executable code that, when executed on a processor, encrypts the custom key using a public key provided by a public certificate of a vault service provided by host infrastructure;
  executable code that, when executed on a processor, stores the encrypted custom key and the encrypted tenant data on a storage appliance, wherein the custom key controls access to the encrypted tenant data;
  executable code that decrypts the custom key using a private key corresponding to the public key;
  executable code that decrypts the tenant data using the custom key; and
  executable code that, following a physical transfer of the tenant data to the host data center, securely backs up the custom key at the host data center using a key management service that makes the custom key available to the tenant following authentication and authorization of the tenant.

4. The method of claim 3, further comprising:
executable code that indexes the decrypted tenant data at the host data center to generate at least one index.

5. The method of claim 4, further comprising:
executable code that accesses the decrypted tenant data at the host data center using the at least one index.

6. The method of claim 1, further comprising:
indexing the decrypted tenant data at the host data center to generate at least one index.

7. The method of claim 6, further comprising:
accessing the decrypted tenant data at the host data center using the at least one index.

8. The method of claim 2, further comprising:
indexing the decrypted tenant data at the host data center to generate at least one index.

9. The method of claim 8, further comprising:
accessing the decrypted tenant data at the host data center using the at least one index.

* * * * *